(12) United States Patent
Nishihata

(10) Patent No.: US 7,782,478 B2
(45) Date of Patent: Aug. 24, 2010

(54) RECORDING AND REPRODUCING APPARATUS AND METHOD THEREOF

(75) Inventor: Motohiro Nishihata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1171 days.

(21) Appl. No.: 11/223,261

(22) Filed: Sep. 12, 2005

(65) Prior Publication Data

US 2006/0056817 A1    Mar. 16, 2006

(30) Foreign Application Priority Data

Sep. 14, 2004   (JP)   ............... 2004-266931
Aug. 24, 2005   (JP)   ............... 2005-243221

(51) Int. Cl.
*G06F 15/00*   (2006.01)
*H04N 7/00*    (2006.01)

(52) U.S. Cl. ............ 358/1.16; 386/95

(58) Field of Classification Search ............ 358/1.16, 358/1.15, 1.14, 1.13, 1.18; 386/52, 72, 95, 386/46, 113, 126, 125; 360/60, 75; 369/103, 369/44.27, 53.2, 53.41, 47.51; 359/29, 559
See application file for complete search history.

(56) References Cited

U.S. PATENT DOCUMENTS

| | | | |
|---|---|---|---|
| 2002/0135608 | A1 | 9/2002 | Hamada et al. |
| 2002/0154226 | A1* | 10/2002 | Gohda ............... 348/231.3 |
| 2004/0179813 | A1* | 9/2004 | Kobayashi ............... 386/46 |

FOREIGN PATENT DOCUMENTS

CN    1383681 A    12/2002

* cited by examiner

*Primary Examiner*—Saeid Ebrahimi Dehkordy
(74) *Attorney, Agent, or Firm*—Oblon, Spivak, McClelland, Maier & Neustadt, L.L.P.

(57) ABSTRACT

The present invention relates to an invention capable of perusing thumbnail images at much higher speed in an apparatus to peruse the thumbnail images by recording an image data in a recording medium such as a disc medium.

16 Claims, 11 Drawing Sheets

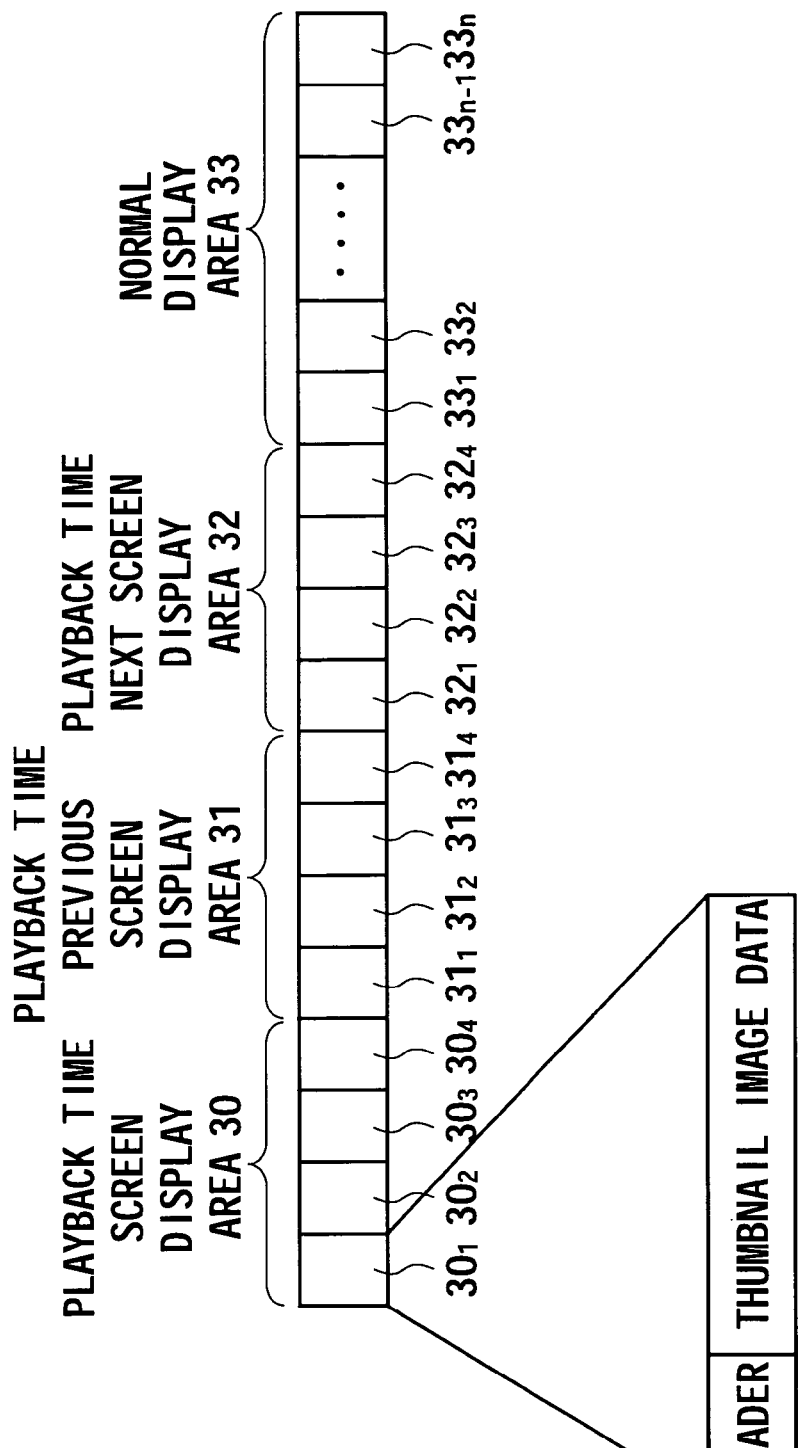

| | PLAYBACK TIME SCREEN DISPLAY AREA30 | | | | PLAYBACK TIME PREVIOUS SCREEN DISPLAY AREA31 | | | | PLAYBACK TIME NEXT SCREEN DISPLAY AREA32 | | | | NORMAL DISPLAY AREA33 | | | | |
|---|---|---|---|---|---|---|---|---|---|---|---|---|---|---|---|---|---|
| | $30_1$ | $30_2$ | $30_3$ | $30_4$ | $31_1$ | $31_2$ | $31_3$ | $31_4$ | $32_1$ | $32_2$ | $32_3$ | $32_4$ | $33_1$ | $33_2$ | $33_{n-1}$ | $33_n$ | |
| FIRST IMAGE CAPTURE | 1 | — | — | — | — | — | — | — | — | — | — | — | 1 | 2 | — | — | FIG. 7A |
| SECOND IMAGE CAPTURE | 1 | 2 | — | — | — | — | — | — | — | — | — | — | 1 | 2 | — | — | FIG. 7B |
| THIRD IMAGE CAPTURE | 1 | 2 | 3 | — | — | — | — | — | — | — | — | — | 1 | 2 | — | 3 | FIG. 7C |
| FOURTH IMAGE CAPTURE | 1 | 2 | 3 | 4 | — | — | — | — | — | — | — | — | 1 | 2 | — | 4 | FIG. 7D |
| FIFTH IMAGE CAPTURE | 5 | — | — | — | 1 | 2 | 3 | 4 | — | — | — | — | 1 | 2 | ⋯ | 5 | FIG. 7E |
| SIXTH IMAGE CAPTURE | 5 | 6 | — | — | 1 | 2 | 3 | 4 | — | — | — | — | 1 | 2 | ⋯ | 6 | FIG. 7F |
| SEVENTH IMAGE CAPTURE | 5 | 6 | 7 | — | 1 | 2 | 3 | 4 | — | — | — | — | 1 | 2 | ⋯ | 7 | FIG. 7G |
| EIGHTH IMAGE CAPTURE | 5 | 6 | 7 | 8 | 1 | 2 | 3 | 4 | — | — | — | — | 1 | 2 | ⋯ | 8 | FIG. 7H |
| NINTH IMAGE CAPTURE | 9 | — | — | — | 5 | 6 | 7 | 8 | 1 | 2 | 3 | 4 | 1 | 2 | ⋯ | 9 | FIG. 7I |
| TENTH IMAGE CAPTURE | 9 | 10 | — | — | 5 | 6 | 7 | 8 | 1 | 2 | 3 | 4 | 1 | 2 | ⋯ | 10 | FIG. 7J |
| ELEVENTH IMAGE CAPTURE | 9 | 10 | 11 | — | 5 | 6 | 7 | 8 | 1 | 2 | 3 | 4 | 1 | 2 | ⋯ | 11 | FIG. 7K |
| TWELFTH IMAGE CAPTURE | 9 | 10 | 11 | 12 | 5 | 6 | 7 | 8 | 1 | 2 | 3 | 4 | 1 | 2 | ⋯ | 12 | FIG. 7L |
| THIRTEENTH IMAGE CAPTURE | 13 | — | — | — | 9 | 10 | 11 | 12 | 1 | 2 | 3 | 4 | 1 | 2 | ⋯ | 13 | FIG. 7M |
| FOURTEENTH IMAGE CAPTURE | 13 | 14 | — | — | 9 | 10 | 11 | 12 | 1 | 2 | 3 | 4 | 1 | 2 | ⋯ | 14 | FIG. 7N |
| FIFTEENTH IMAGE CAPTURE | 13 | 14 | 15 | — | 9 | 10 | 11 | 12 | 1 | 2 | 3 | 4 | 1 | 2 | ⋯ | 15 | FIG. 7O |
| SIXTEENTH IMAGE CAPTURE | 13 | 14 | 15 | 16 | 9 | 10 | 11 | 12 | 1 | 2 | 3 | 4 | 1 | 2 | ⋯ | 16 | FIG. 7P |

RECORDING AND REPRODUCING APPARATUS AND METHOD THEREOF

CROSS REFERENCES TO RELATED APPLICATIONS

The present invention contains subject matter related to Japanese Patent Application JP 2004-266931 filed in the Japanese Patent Office on Sep. 14, 2004 and Japanese Patent Application JP 2005-243221 filed in the Japanese Patent Office on Aug. 24, 2005, the entire contents of which being incorporated herein by reference.

BACKGROUND OF THE INVENTION

1. Field of the Invention

The present invention relates to a recording and reproducing apparatus and a method thereof, and it is, for example, suitably applied to a recording and reproducing apparatus by using a disc media as a recording medium.

2. Description of the Related Art

Various kinds of disc media such as Compact Disc (CD), Mini Disc (MD), Digital Versatile Disc (DVD), and a blue-ray disc (Blue-Ray Disc) (Registered Trademark of Sony Corporation) have been developed, and widely used as a recording medium such as an audio data, a video data and other computer data.

As the recording and reproducing apparatus corresponding to these disc media, there has been known a digital camera to record and reproduce an image file of an Exif format (Exchangeable Image File Format) generated based on the image of a still image captured by, for example, a Charge Coupled Device (CCD) camera.

Now, in the digital camera corresponding to such disc media, in case the recorded image files are to be reproduced as described above, usually it is, for example, by displaying in order the image files of the predetermined number of images from the image files newly captured in the display unit including a high resolution color liquid crystal display and the like that the reproduction is performed.

That is, the digital camera first performs seeking operations in order from the image files newly captured, thereby reading in order the image files from the disc media and recording the files in a buffer. After that, when the image files of the number of the images to be displayed in the display unit are stored in the buffer, the digital camera displays thumbnail images in the display unit based on the thumbnail image data of the stored image files.

However, in such a case, since the image files are sometimes discretely recorded in various positions in the disc media, the seek operation of each image file takes a lot of time, and as a result, there is a problem in that it takes a long time to allow the thumbnail image based on the thumbnail image data to be displayed in the display unit.

As a method of solving such a problem, apart from each image file, the thumbnail image data of each image file is lined up in order of the image files generated, so that the thumbnail image files including such thumbnail image data are generated, and these files are recorded in the disc media. Thus, there has been proposed a recording and reproducing apparatus (for example, see Japanese Patent Laid-Open No. 2004-5934) wherein, at the reproduction time, such thumbnail image files are read from the disc media, and the thumbnail images based on the thumbnail image files are allowed to be displayed in the display unit in newly captured order, so that an index display speed of the thumbnail image is quickened.

SUMMARY OF THE INVENTION

However, in the recent disc media such as DVD and the like, since a large amount of data can be recorded, in case a large number of image files are recorded in the disc media, it takes a long time from starting the reading of the thumbnail image files till storing the newly captured thumbnail image data in the buffer.

As a result, since it takes a long time to display the thumbnail image based on the newly captured thumbnail image data in the display unit, there is a problem in that the usability is not friendly for the user.

Hence, the present invention provides a recording and reproducing apparatus to record a data in the disc media and reproduce the data, including:

a recording mechanism to record the data in the disc media, a reproducing mechanism to reproduce the data from the disc media, an acquiring mechanism to acquire the thumbnail image of the inputted image data, a storing mechanism, a control mechanism to allow the thumbnail image file including plural thumbnail images to be stored in the storing mechanism, and allow the acquired thumbnail image to be stored at a predetermined position of the thumbnail image file stored in the storing mechanism, and record the thumbnail image file stored in the storing mechanism in the disc media.

Further, the present invention provides a recording and reproducing method to record and reproduce the predetermined data of the disc media, including the steps of:

generating the image data of the thumbnail image based on the image data of the captured image supplied from the outside, and recording the image data of the thumbnail image generated by the thumbnail image generating unit in the disc media, and at the same time, recording the image data of the predetermined thumbnail image displayed first in a list collectively in a predetermined area.

The present invention has been made in view of the above described situation, and proposes a recording and reproducing apparatus and the method thereof, which can exceptionally enhance the usability.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 6A and 6B are conceptual illustrations provided to explain the file structure of a thumbnail image file;

FIGS. 7A to 7P are conceptual illustrations provided to explain the storage control of the thumbnail image data;

DETAILED DESCRIPTION OF THE EMBODIMENT

A first embodiment of the present invention will be described below in detail with reference to the drawings.

Figure 1:
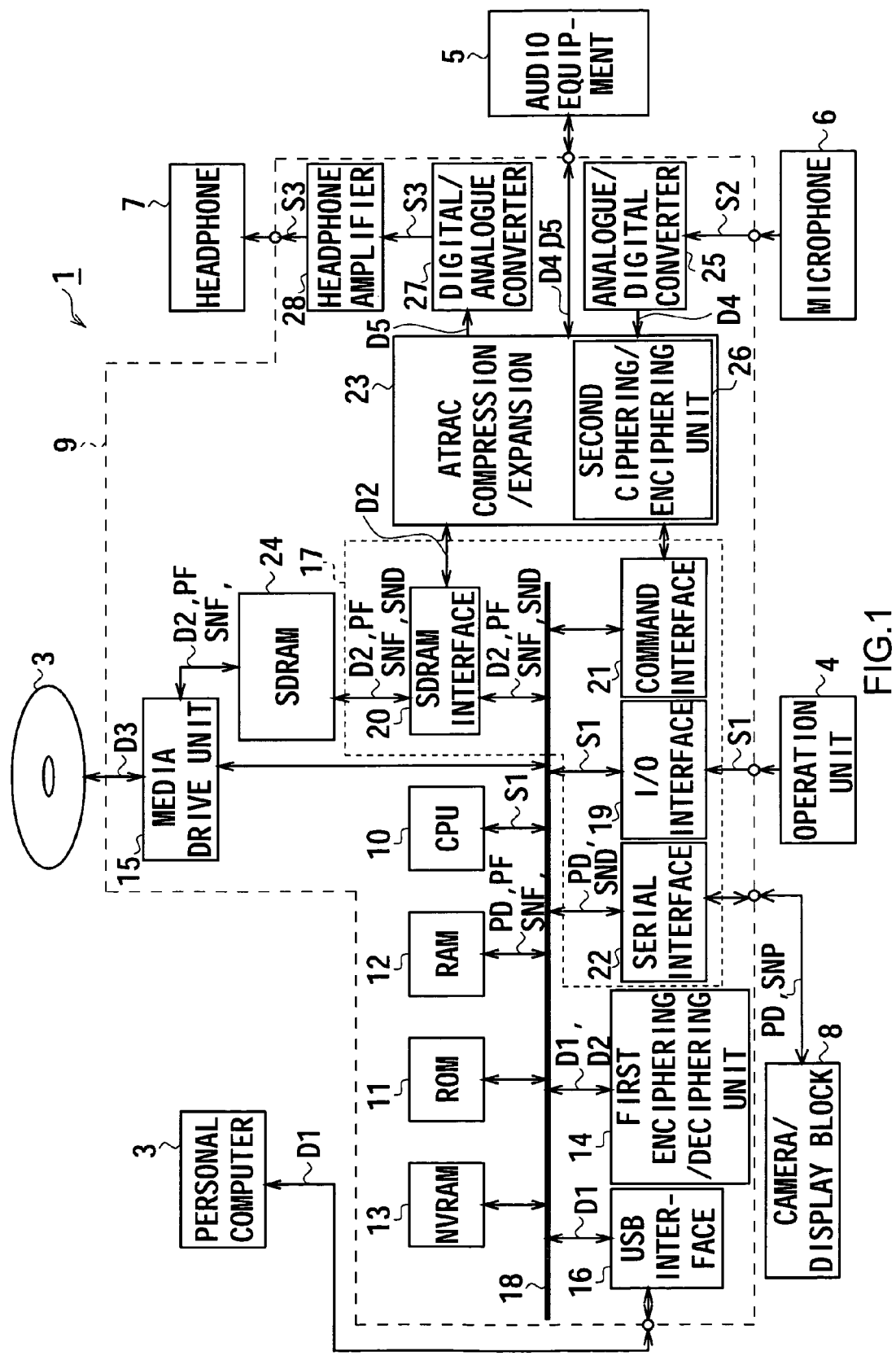
FIG. 1 is a schematic diagrammatic view showing the structure of a recording and reproducing apparatus according to the present embodiment.

(1) In FIG. 1 relating to the outline of the next generation disc according to the magneto-optical recording according to the present embodiment, reference numeral 1 denotes a recording and reproducing apparatus as a whole according to the present embodiment, which can perform the recording and reproduction of an audio data with a disc of the mini disc (MD) system as a recording medium. However, this recording and reproducing apparatus 1 can use not only the mini disc for music in widespread use, but also makes much high-density recording possible, and can handle a high-density disc (referred to also as next generation disc) that can be used for the storage of the image data and various data for computer use other than the audio data.

Here, before making a description on the entire structure of the recording and reproducing apparatus 1 according to the present embodiment, an outline of the next generation disc according to magneto-optic recording to which this recording and reproducing apparatus 1 corresponds.

First, such next generation disc, to attempt at affinity with the current personal computer, performs the recording and reproduction of a content data such as an audio data by using a File Allocation Table (FAT) system as a file management system. Further, by changing an error correcting system, a modulation system, and the like for the current MD system, an attempt is made to increase a recording capacity of the data, and at the same time, enhance reliability of the data.

As a recording and reproduction format of the next generation disc, at present, there are two kinds of specifications under development. For the purpose of explanation, these discs shall be referred to as a first next generation MD, and a second next generation MD.

The first next generation MD has a specification in which a disc exactly equal to the disc used in the current MD system is used, and the second next generation MD has a specification in which, while the external shape is the same as that of the disc used in the current MD system, by using a magnetic super resolution (MSR) technology, the recording density in a line recording direction is increased so as to increase a recording capacity.

In the current MD system (audio MD and MD-DATA, a magneto-optical disc having a diameter of 64 mm stored in a cartridge is used as the recording medium. The thickness of the disc is 1.2 mm, and in the center thereof, there is provided a center hole having a diameter of 11 mm. The shape of the cartridge is 68 mm in length×72 mm in width×5 mm in thickness.

In the first and second next generation MD specifications also, the shapes of these discs and cartridges are all the same.

With respect to the starting position of a read-in area also, both the first and second next generation MDs start from a radial position at 29 mm, and are the same as the disc used in the current MD system. That is, interchangeability with the MD used in the past is maintained in terms of the outer shape.

With respect to a track pitch, it is taken as 1.25 µm for the second next generation MD, and 1.6 µm for the first next generation MD appropriating a disc of the current MD system. With respect to a pit length, it is taken as 0.44 µm/pit for the first next generation MD, and 0.16 µm/pit for the second next generation MD. With respect to a redundancy, it is taken as 20.50% for both the first and second next generation MDs.

In the disc of the second next generation MD specification, by using the magnetic super resolution technology, a recording capacity in a line density direction is designed to be enhanced. The magnetic super resolution technology utilizes the fact that, when reaching a predetermined temperature, a cut layer is magnetically put into a neutral state, and a domain wall transferred on a recording layer is transferred, so that a minute mark begins to be seen in a beam spot.

To be specific, in the disc of the second next generation MD specification, at least a magnetic layer that becomes a recording layer to record information, a cut layer, and a magnetic layer for reproducing the information are laminated on a transparent substrate. The cut layer becomes a switched connection status force adjustment layer. When reaching a predetermined temperature, the cut layer is magnetically put into a neutral state, and a domain wall transferred on the recording layer is transferred on a magnetic layer for use of reproduction. This allows a minute mark to be seen in a beam spot. Incidentally, at the recording time, by using a laser pulse magnetic field modulation technology, a minute mark can be generated.

Further, in the disc of the second next generation MD specification, to improve a detrack margin, a cross talk from land, a cross talk of a wobble signal, and a leak of focus, a groove is made deep, and inclination of the groove is made sharp. That is, in the disc of the second next generation MD specification, the depth of the groove is, for example, 160 nm to 180 nm, and the inclination of the groove is, for example, 60 degrees to 70 degrees, and the width of the groove is, for example, 600 nm to 700 nm.

With respect to an optical specification, in the first next generation MD specification, a laser wavelength $\lambda$ is taken as 780 nm, and a numerical aperture NA of the object lens of an optical head is taken as 0.45. Similarly, in the second next generation MD specification also, the laser wavelength $\lambda$ is taken as 780 nm, and a numerical aperture NA of the object lens of an optical head is taken as 0.45.

Further, as a recording system, in the first next generation MD, a groove recording system is adapted, which uses a groove (a groove on the face of disc) as a track for recording and reproducing, and in the second next generation MD, a groove recording system and a domain wall displacement detection (DWDD) system are adapted.

Further, as an error correction coding system, while in the current MD system, there has been used a convolutional code by an ACIRC (Advanced Cross Interleave Reed-Solomon Code), in the first and second next generation MD specifications, the code of a block complete type is used, which is a combination of a RS-LDC (Reed Solomon-Long Distance Code) and a BIS (Burst Indicator Subcode). By adapting the error correction code of this block complete type, a linking sector becomes unnecessary. In the error correction system having combined the LDC and the BIS, when a burst error occurs, an error location can be detected by the BIS. By using this error location, an erasure correction can be made by the LDC code.

As an address system, a wobbled groove system is adapted, which, upon forming a groove by a single spiral, a wobble is formed as an address information for both sides of this groove. Such an address system is referred to as an ADIP (Address in Pre-groove).

With respect to the specification of the ADIP, while it is the same as the current MD system, in the current MD system, a sector including 2352 bytes is taken as an access unit of the recording and reproduction. In contrast to this, in the first and second next generation MD specifications, 64 K bytes are taken as an access unit (recording block) of the recording and reproduction.

Further, in the current MD system, the convolutional code referred to as the ACIRC is used as the error correction code, while in the first and second next generation MD specifications, the code of the block completion type combining the LDC and the BIS is used.

Hence, in the first next generation MD specification appropriating the disc of the current MD system, the handling of the ADIP signal is made different from the time when the current MD system has been handled. Further, in the second next generation MD, the specification of the ADIP signal is given a change so as to match the specification of the second next generation MD.

With respect to the modulation system, in the current MD system, an EFM (8 to 14 Modulation) is used. In contrast to this, in the first and second next generation MD specifications, a RLL (1, 7) PP (RLL; Run Length Limited, PP: Parity Preserve/Prohibit Repeated Minimum Transition Run length Code) (hereinafter referred to as 1-7 pp modulation) is adapted. Further, the detection method of a data uses a partial response PR (1, 2, 1) ML in the first next general MD, and in the second next generation MD, a viterbi deciphering system using a partial response PR (1, −1) ML is used.

Further, a disc driving system is a CLV (Constant Linear Velocity), and its linear speed is taken as 2.7 m/sec in the first next generation MD specification, and in the second next generation MD specification, it is taken as 1.98 m/sec. Incidentally, in the current MD system specification, it is taken as 1.2 m/sec for 60 minute disc, and as 1.4 m/sec for 74 minute disc.

In the first next generation MD specification appropriating the disc used in the current MD system as it is, a total data recording capacity per a disc is approximately 300M bytes (in case of using 80 minute disc). Since the modulation system is changed from the EFM modulation to the 1-7 pp modulation, a window margin is changed from 0.5 to 0.666, thereby realizing 1.33 times high density in this respect.

Further, as the error correction system, since it is changed to the combination of the BIS and the LDC from the ACIRC system, data efficiency is increased, and in this respect, 1.48 times high density can be realized. Comprehensively, by using quite the same disc, approximately two times data capacity has been realized, comparing to the current MD system.

In contrast to this, in the disc of the second next generation MD specification using the magnetic super resolution, an attempt is further made at high density in the linear density direction, and a total data recording capacity becomes approximately 1 G bytes. Incidentally, a data rate is 4.4 Mbit/sec in the first next generation MD, and in the second next generation MD, it is 9.8 M bit/sec.

Figure 2A:
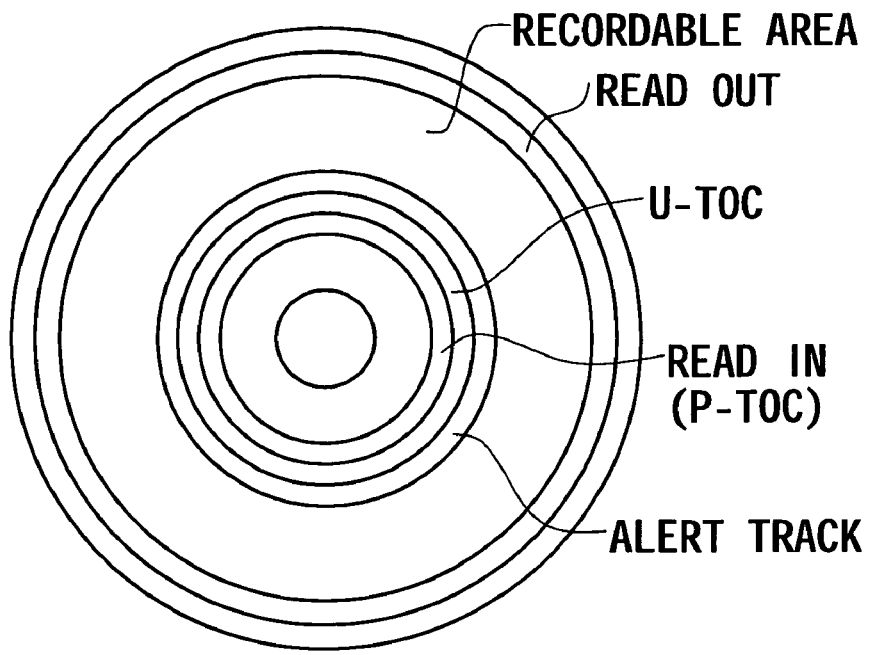
FIGS. 2A and 2B are a top plan view and a conceptual illustration showing the structure and data format of the disc of a first next generation MD.

FIG. 2A shows a disc structure of the first next generation MD disc. The first next generation MD disc appropriates the current MD system disc as it is. That is, it is configured to have a dielectric film, a magnetic film, a dielectric film, and a reflecting film laminated on a transparent polycarbonate substrate. Further, a protective film is laminated on the substrate.

In the first next generation MD disc, as shown in FIG. 2A, a read-in area of the inner periphery of the disc is provided with a P-TOC (premastered TOC (Table of Contents) area. This area becomes a premastered area as a physical structure, and by emboss pit, control information and the like is recorded as P-TOC information.

The outer periphery of the read-in area in which the P-TOC area is provided is taken as a recordable area (area capable of magneto-optic recording), and becomes an area capable of recording and reproduction in which a groove is formed as the guide groove of a recording track. The inner periphery of this recordable area is provided with a U-TOC (user TOC).

The user TOC in this case has the same structure as that of the U-TOC used to record the management information of the disc by the current MD system. To describe further by way of confirming, the U-TOC, in the current MD system, is management information rewritten according to order of music, recording, erasing, and the like of tracks (audio track/data track), and controls a starting point, an end point, and a mode with respect to each track (part configuring to have each track).

Further, the outer periphery of the U-TOC is provided with an alert track. The alert track is a warning track in which a warning sound is recorded showing that this disc is used in the first next generation MD system, and is unable to be reproduced by a player of the current MD system.

Figure 2B:
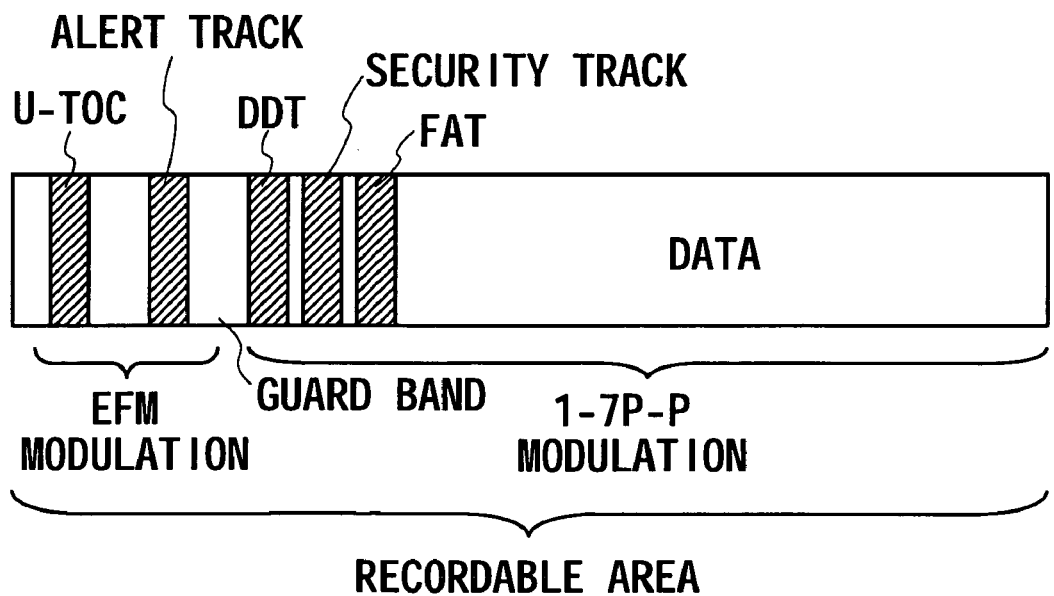

FIG. 2B shows a structure of the recordable area of the disc of the first next generation MD specification. As is evident also from FIG. 2B, the starting head (inner peripheral side) of the recordable area is provided with the U-TOC and the alert track. The area where the U-TOC and the alert track are included is recorded with a data modulated by the EFM so that even the player of the current MD system can reproduce.

The outer periphery of the area recorded with a data modulated by this EFM modulation is provided with an area recorded with a data modulated by the 1-7 pp modulation of the next generation MD. A space between the area recorded with a data modulated by the EFM modulation and the area recorded with a data modulated by the 1-7 pp modulation is isolated by a predetermined distance, and is provided with a guard band. Since such a guard band is provided, a trouble caused by mounting a disc of the first next generation MD specification on the current MD player is prevented.

The starting head (inner peripheral side) of the area recorded with a data modulated by the 1-7 pp modulation is provided with a DDT (Disc Description Table) area and a security track. The DDT area is provided to perform a sector alternation processing for a sector (recording block) having a physical defect. In the DDT area a disc ID is further recorded. The disc ID is an identification code intrinsic to each recording medium, and is based, for example, on a random figure predeterminedly generated.

Further, in the DDT area an area is recorded as a scratch pad, and a bit map referred to as a SRB (Serial Recording Bitmap) which takes a bit corresponding to a recorded cluster as [1]. A security track storing information attempting at the protection of the content.

Further, the area with a data modulated by the 1-7 pp modulation recorded is provided with a FAT (File Allocation Table). This FAT area is an area to control the data by the FAT system.

The FAT system performs a data control in conformity with the FAT system used in a general purpose personal computer.

The FAT system performs a file control by a FAT chain by using a directory showing a file in the route and an entry point of the directory and the FAT table describing consolidating information on the FAT cluster.

In the disc of such first next generation MD specification, in the U-TOC area is recorded information on the starting point of the alert track and information on the starting point of the area with a data modulated by the 1-7 pp modulation recorded.

Here, when the player of the current MD system is mounted with the first next generation MD disc of the above described structure, the U-TOC area is read, and from the information on the U-TOC, the position of the alert track is known, and the alert track is accessed, and the reproduction of the alert track is started.

In the alert track is recorded a warning sound showing that this disc is used in the first next generation MD system, and is unable to be reproduced by a player of the current MD system. From this warning sound, it is informed that this disc is not usable by a player of the current MD system. Incidentally, as the warning sound in this case, a warning by the language to the effect that "the disc is not usable by this player" can be adapted. Needless to mention, a buzzer sound may be used.

In the meantime, in case the player in conformity with the first next generation MD is mounted with the first next generation MD disc, the U-TOC area is read, and from the information on the U-TOC, the starting point of the area in which a data modulated by the 1-7 pp modulation is recorded is known, and thus, the DDT, the security track, and the FAT area are read. As described above, in the area in which a data modulated by the 1-7 pp modulation is recorded, the data control is performed not by the U-TOC but the FAT system.

Figure 3A:
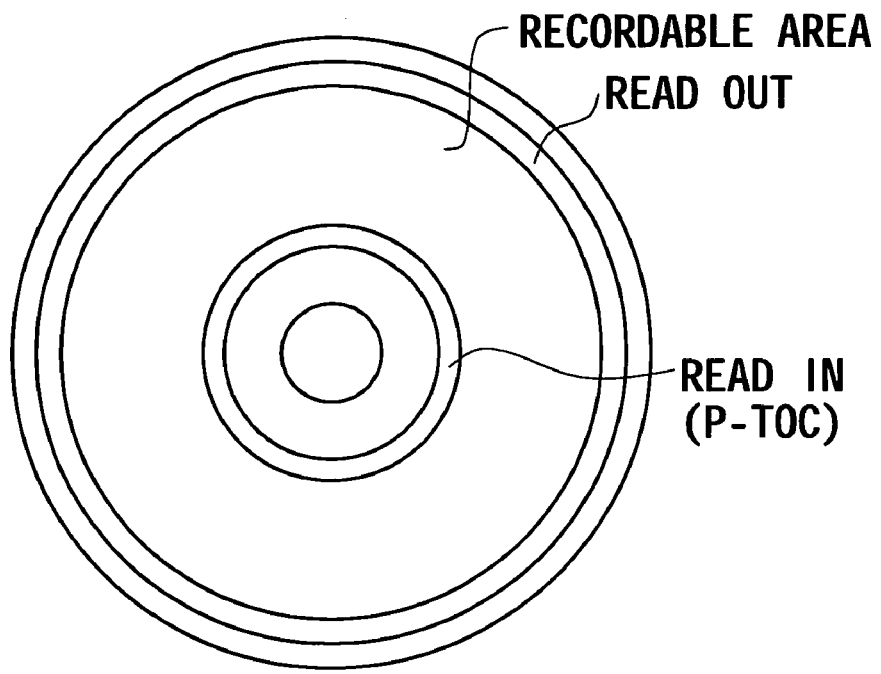
FIGS. 3A and 3B are a top plan view and a conceptual illustration showing the structure and data format of the disc of a second next generation MD.

FIG. 3A shows a structure of the second next generation MD disc. In this case also, the disc is configured to have a dielectric film, a magnetic film, a dielectric film, and a reflecting film laminated on a transparent polycarbonate substrate. Further, a protective film is laminated on the substrate.

In the case of the second next generation MD disc, as shown in the figure, in the read-in area of the inner periphery of the disc control information by an ADIP signal is recorded.

In the second next generation MD disc, the read-in area is not provided with the P-TOC by the emboss pit, but instead of that, the control information by the ADIP signal is used. A recordable area starts from the outer periphery of the read-in area, and becomes a recording and reproduction capable area in which a groove is formed as a guide groove of the recording track. In this recordable area a data modulated by the 1-7 pp modulation is recorded.

Whether a certain disc is the first next generation MD or the second next generation MD can be decided by the information on the read-in. That is, if the P-TOC by the emboss pit is detected in the read-in, it is determined to be the disc of the current MD or the first next generation MD. If the control information by the ADIP signal is detected in the read-in, and the P-TOC by the emboss pit is not detected, it is determined to be the second next generation MD.

Incidentally, discrimination between the first and second next generation MDs is not limited to such a method. It may determine from the phase of tracking error signal at the time of on tack and off track. Of course, a detection hole and the like for disc recognition may be provided for the cartridge and the like.

Figure 3B:
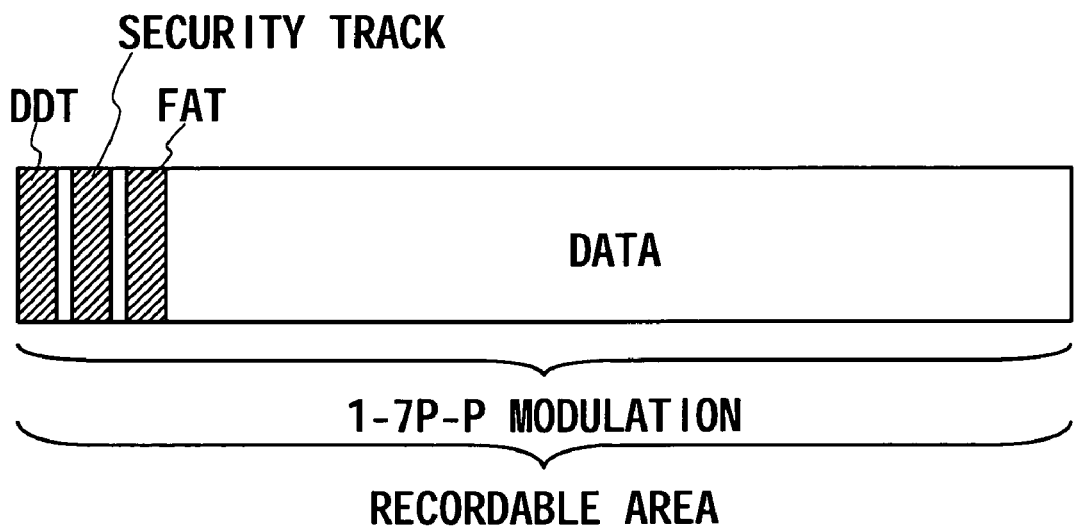

As a structure of the recordable area of the second next generation MD disc, as shown in FIG. 3B, there is formed the entire area in which a data modulated by the 1-7 pp modulation is recorded. The starting head (inner peripheral side) of this area in which a data modulated by the 1-7 pp modulation is recorded is provided with a DDT area and a security track.

In this case also, the DDT area is taken as an area to perform a sector alternation processing for a sector (recording block) having a physical defect. Further, in the DDT area the disc ID is recorded. The DDT area is also provided with the scratch pad area and the SRB. Further, in this case also, the security track stores the information attempting at the protection of the content.

Further, the area in which a data modulated by the 1-7 pp modulation is recorded is also provided with the FAT area. The FAT area is an area to control the data by the FAT system. The FAT system performs data management in conformity with the FAT system used in a general purpose personal computer.

In such second next MD disc, as is evident from FIG. 3B, there is provided no U-TOC area. That is, with respect to the second next generation MD disc, it is assumed to be used with the player only which is in conformity with the next generation MD.

In the player in conformity with the next generation MD, when the second next generation MD disc is mounted, the DDT area located at a predetermined area, the security track and the FAT area are read, and the data control is performed by using the FAT system.

As the data controlled by the FAT system in this manner and recorded in the data areas of FIGS. 2B and 3B, there are a data file, a track information file (TIF), a key information file, a MAC list file, and the like.

The data file is, for example, a data file such as an audio data, a computer use data, and the like.

Further, the track information file (TIF) is a file in which various pieces of information is recorded to control a music data stored in the audio data file. The track information file is provided with a play order table showing a reproduction sequence of music, a programmed play order table to control a reproduction sequence designated by the user, a group information table to control whether or not it is a group in a unit of music piece album and the like, a track information table describing information relating to each track (each music piece), a part information table to control the part of each track, and a name table to control character information added to each track.

Further, the key information file describes a data showing the version information of the key in the enciphering system. Further, the MAC list file describes a MAC value to check tampering.

(2) Referring back to FIG. 1 with respect to the description of the internal structure of the recording and reproducing apparatus 1 according to the present embodiment, the internal structure of the recording and reproducing apparatus 1 according to the present embodiment will be described.

The recording and reproducing apparatus 1 according to the present embodiment is connected to an external equipment 2 (hereinafter referred to as personal computer) so as to be able to function as an external storage equipment for the personal computer 2. Further, mounted with a function through the personal computer 2 or capable of connecting with a network directly, the apparatus performs a network connection so that the audio data and various data can be downloaded, thereby recording these data in the disc 3.

Further, this recording and reproducing apparatus 1, even if not connected to the personal computer 2 and the like, functions, for example, as audio equipment. In this case, by operating an operation unit 4 by the user, the audio data based on the inputted music and the like, for example, from an audio equipment 5, a microphone 6, and the like is recorded in the disc 3, and the music based on the audio data read from the disc 3 can be reproduced in a headphone 7 and the audio equipment 5.

Figure 5:
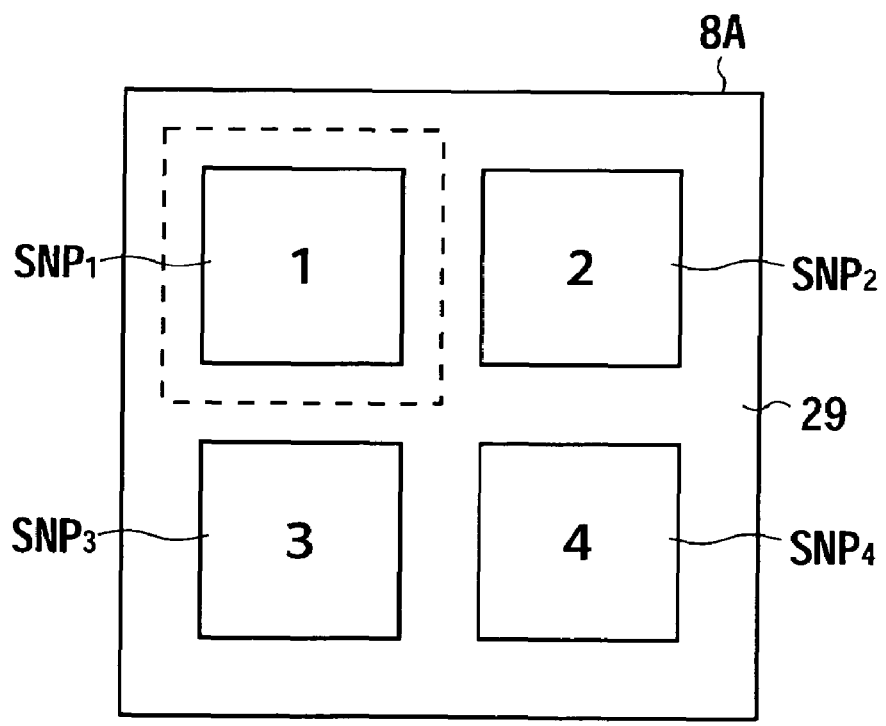
FIG. 5 is a conceptual illustration showing the structure of a reproduction image selection screen.

Further, this recording and reproducing apparatus 1 is provided with a camera/display block 8 configured to have an image capture unit including, for example, a lens system, a CCD camera and the like, a signal conversion unit to convert the captured image into the image data of a predetermined format, and a display 8A (FIG. 5) to perform the displaying of the captured image, for example, a operating state, a mode state, a character data such as the name of the musical piece and the like, a track number, time information, and other pieces of information. The image file based on the image captured by the image capture unit of the camera/display block 8 is recorded in the disc 3, and the image based on the image data recorded in the disc 3 can be reproduced in the display unit 8A of the camera/display block 8.

That is, the recording and reproducing apparatus 1 according to the present embodiment can be used as general purpose data storage equipment when connected to the personal computer 2 and the like, and moreover, can be used also as audio recording and reproducing equipment and camera equipment in a single set.

Hereinafter, an operating state, in which data recording and reproduction is performed as non-connected equipment of the personal computer 2, is referred to as "storage mode", an operating state, in which audio recording and reproduction is performed in a single set without being connected to the personal computer 2, is referred to as "audio mode", and an operating state, in which the image capture by the camera and the reproduction of the captured image are performed, is referred to as "camera mode".

In FIG. 1, a main unit 9 within the recording and reproducing apparatus 1 is configured to have a Central Processing Unit (CPU) 10 controlling the entire system, a Read Only Memory (ROM) 11, a Random Access Memory (RAM) 12, a battery built-in NVRAM (Non-Volatile Random Access Memory) 13, a first enciphering/deciphering unit 14, a media drive unit 15, an USB interface 16, and an internal interface 17 mutually connected through a bus 18.

Further, the internal interface 17 is configured to have an Input/Output (I/O) interface 19, a Synchronous Dynamic Random Access Memory (SDRAM) interface 20, a command interface 21, and a serial interface 22.

The CPU 10 executes various control processings based on actuating signal S1 supplied by the operation of the operation unit 4, in which various commands such as a writing request, a reading request, and the like transmitted from the personal computer 2 through the USB interface 16, various operation keys such as a menu key and a reproduction key, and various operation dials such as a jog dial are provided. Further, the CPU 10 executes the control processing of an Adaptive Transform Acoustic Coding (ATRAC) compression/expansion unit 23 through the command interface 21.

Further, the ROM 11 stores an operation program and fixed parameters, and the like of the CPU 10. Further, the RAM 12 is used as a work area by the CPU 10, expands the operation program and the like, and is taken as a storing area of various pieces of necessary information. Further, the NVRAM 13 is a non-volatile RAM, in which the stored information is kept stored without being eliminated even if the power source is cut off because of a built-in battery, and is taken as a storing area of various pieces of setting information.

In reality, the CPU 10 performs a processing for data transmission as the storage equipment at the time of the storage mode when connected to the personal computer 2, which is an external host equipment.

That is, the CPU 10, upon receipt of the writing request of the audio data and the various data from the personal computer 2 through the USB interface 16, issues a writing permit to the personal computer 2 in response to this request. As a result, the audio data and various data are transmitted as a send/receive data D1 from the personal computer 2, and this data is given to a first coding/decoding unit 14 through the USB interface 16.

The first ciphering/deciphering unit 14, under the control of the CPU 10, gives a decoding processing for deciphering to a send/receive data D1 of the supplied audio data and various data when ciphered, and sends a recording and reproduction data D2 of the acquired audio data and various data to a SDRAM 24 through a SDRAM interface 20, and subjects this to a buffering in the SDRAM 24, and after that, reads the recording and reproduction data D2 in a predetermined timing, and sends this to a media drive unit 15.

The media drive 15 corresponds to the current MD and the first and second next generation MDs, and under the control of the CPU 10, gives to the supplied recording and reproduction data D2 modulation processing by the EFM modulation system or the 1-7 pp modulation system, and sends a modulation data D3 of the acquired audio data and various data to the disc 3. This allows the modulation data D3 to be recorded at an address position designated by the CPU 10 on the disc 3.

Further, the CPU 10, upon receipt of the reading request of the audio data and the various data transmitted from the personal computer 2 through the USB interface 16, issues a reading permit to the personal computer 2 in response to this request. As a result, the media drive 15, under the control of the CPU 10, gives to the corresponding modulation data D3 read from the disc 3 the deciphering processing by the EFM demodulation system or the 1-7 pp demodulation system, and transmits the acquired recording and reproduction data D2 to the personal computer 2 as a send/receive data D1 through the SDRAM 24, the SDRAM interface 20 and the USB interface 16 in that order.

In the meantime, the CPU 10 performs the recording and reproduction processing of the audio data at the time of the audio mode, in which the recording and reproducing apparatus 1 functions as the audio equipment in a single set.

That is, the CPU 10, when the operation unit 4 is operated and an actuating signal S1 such as a recording command and the like is inputted, controls an ATRAC compression/expansion unit 23 in response to this, and at this time, for example, music, sounds, and the like are collected in the microphone 6, and the acquired audio signal S2 is given a predetermined processing such as, for example, analogue/digital conversion processing and the like in an analogue/digital converter 25, and the acquired digital audio data D4 is transmitted to the ATRAC compression/expansion unit 23.

Further, the CPU 10, when the operation unit 4 is operated and the actuating signal S1 such as a recording command and the like is inputted, controls the ATRAC compression/expansion unit 23 in response to this, and at this time, the digital audio data D4, for example, such as music, and the like transferred in the audio equipment 5 through an optical cable and the like is sent to the ATRAC compression/expansion unit 23.

The ATRAC compression/expansion unit 23 is provided with an unillustrated ATRAC compression encoder/decoder, and under the control of the CPU 10, gives to the supplied digital audio data D4 an ATRAC compression encode processing as needed and an ciphering processing by a predetermined algorithm in a second ciphering/deciphering unit 26, and sends the acquired audio data and the like to the media drive unit 15 as a recording and reproduction data D2 through the SDRAM interface 20 and the SDRAM 24 in that order. The media drive unit 15, under the control of the CPU 10, gives to the supplied recording and reproduction data D2 the same processing as described above, and sends the modulation data D3 of the acquired audio data and the like to the disc 3. This allows the modulation data D3 to be recorded at an address position designated by the CPU 10 on the disc 3.

Further, the CPU 10, when the operation unit 4 is operated and the actuating signal S1 such as a voice reproduction command and the like is inputted, controls the media drive unit 15 in response to this, and gives to the corresponding modulation data D3 read from the disc 3 the same processing as described above, and sends the acquired recording and reproduction data D2 to the ATRAC compression/expansion unit 23 through the SDRAM 24 and the SDRAM interface 20 in that order.

The ATRAC compression/expansion unit 23, under the control of the CPU 10, gives to the supplied recording and reproduction data D2 an ATRAC expansion decode processing as needed and a deciphering processing for deciphering in the second ciphering/deciphering unit 26, and sends the acquired digital audio data D5 to an digital/analogue converter 27. Further, the ATRAC compression/expansion unit 23, under the control of the CPU 10, performs the same processing as described above, and sends the acquired digital audio data D5 to the audio equipment 5. This allows the music based on the digital audio data D5 to be outputted from the speaker of the audio equipment 5.

The digital/analogue converter 27 gives to the supplied digital audio data D5 a predetermined signal processing such as a digital/analogue conversion processing and the like, and sends the acquired audio signal S3 to a headphone 7 through a headphone amplifier 28. This allows the music based on the audio signal S3 to be outputted from the headphone 7.

On the other hand, the CPU 10 performs the recording and reproduction processing of the image data at the camera mode time in which the recording and reproducing apparatus 1 functions as the camera equipment in a single set.

That is, the CPU 10, when the operation unit 4 is operated and the actuating signal S1 such as an image recording command and the like is inputted, and the actuating signal S1 such as the image capture command and the like is inputted, controls the camera/display block 8 in response to this, thereby capturing a person or a scene that becomes an object in the image capture unit, and gives an image compression processing and the like in conformity with the predetermined image compression system, for example, such as an analogue/digital conversion processing and the JPEG (Joint Photographic Experts Group) in the signal processing unit. This allows the CPU 10 to generate a captured image data (hereinafter this is referred to as a main image data) PD in the camera/display block 8, and capture the main image data PD thus acquired into the RAM 12 through a serial interface 22 so as to be expanded.

At this time, the CPU 10 sends to the RAM 12 additional information BD including information such as the date and hour when the main image data PD is generated, a model name of the generated device, an aperture value at the time of the generation, a setup of a shutter speed and the like, and information such as a compression mode to accurately read the data of the main image data PD, a color space, the number of pixels, and the like. Further, the CPU 10 generates a thumbnail image data SNP based on the main image data PD supplied in the RAM 12. This allows the CPU 10 to generate, for example, an image file PF of an Exif format based on these additional information BD, the thumbnail image data SNP, and the main image data PD. Here, while a description has been made that the thumbnail image data SNP is generated by the CPU 10, for example, the thumbnail image data SNP may be generated within the camera/display block 8 and transmitted through the serial interface so as to be acquired by the CPU.

Figure 4:
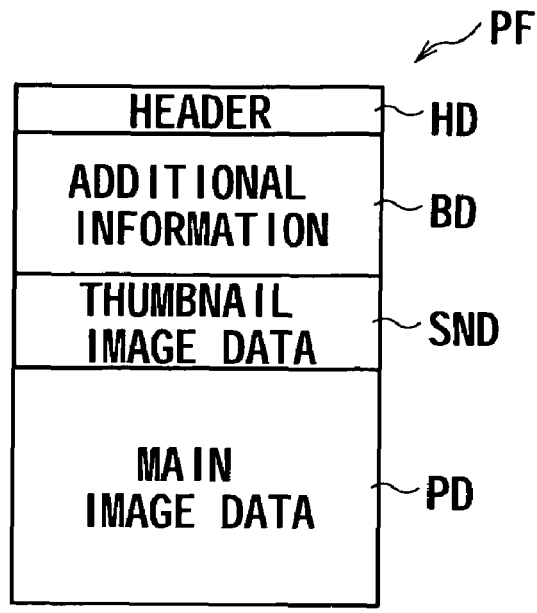
FIG. 4 is a conceptual illustration showing the structure of an image file.

This image file PF, as shown in FIG. 4, has a file structure, in which, for example, the additional information BD is described after a header HD, and after that, the thumbnail image data SNP is described, and further after that, the main image data PD is described.

The CPU 10 sends the image file PF generated in the RAM 12 to the media drive unit 15 through the SDRAM interface 20 and the SDRAM 24 in that order. The media drive unit 15, under the control of the CPU 10, gives to the supplied image file PF the same processing as described above, and sends the acquired modulated data D3 of the image file PF to the disc 3. This allows the modulation data D3 to be recorded at the address position designated by the CPU 10 on the disc 3.

Further, the CPU 10 generates the image file PF as described above, and at the same time, generates a thumbnail image SNF as shown in FIG. 6 to be described later, and stores the thumbnail image data SNP generated based on the main image data PD supplied to the RAM 12 into a thumbnail image file SNF. Further, registered information on the thumbnail image showing that it is stored is generated. Here, the thumbnail image is a general name given to an image in which the data capacity is smaller than the main image data by reducing the number of pixels of the main image data and increasing the compression ratio of the image compression.

The CPU 10, when the operation unit 4 is operated and the actuating signal S1 such as a stop command and the like to stop an image recording command is inputted, sends the thumbnail image file SNF generated in the RAM 12 to the media drive unit 15 through the SDRAM interface 20 and the SDRAM 24 in that order. The media drive unit 15, under the control of the CPU 10, gives to the supplied thumbnail image file SNF the same processing as described above, and sends the acquired modulation data D3 of the thumbnail image file SNF to the disc 3. This allows the modulation data D3 to be recorded at the address position designated by the CPU 10 on the disc 3. In addition, it also allows the registration information of the thumbnail image to be recorded in a predetermined position.

Further, the CPU 10, in case the thumbnail image file SNF is recorded on the disc 3, controls the media drive unit 15, thereby giving to the modulation data D3 of the thumbnail image file SNF read from the disc 3 the same processing as described above, and takes the acquired thumbnail image file SNF into the RAM 12 through the SDRAM 24 and the SDRAM interface 20 in that order so as to be expanded.

After that, the CPU 10 generates the image file PF as described above, and at the same time, stores the thumbnail image data SNP generated based on the main imaged data PD supplied to the RAM 12 into the thumbnail image file SNF. In this case, as an actual operation, a control is made in such a manner that the registration information on the thumbnail image is renewed so that an addition is made to the thumbnail image already stored and registered in the thumbnail image file SNF, and further, a new thumbnail image is additionally registered.

The CPU 10, when the operation unit 4 is operated and the actuating signal S1 such as a stop command and the like to stop an image recording command is inputted, performs the same processing as described above, thereby sending the acquired modulation data D3 of the thumbnail image file SNF to the disc 3. This allows the modulation data D3 to be recorded on the disc 3. At this time, the renewed thumbnail image file is overwritten and recorded at the same address position as that of the thumbnail image file SNF recorded on the disc 3. Further, in case it is determined to be very difficult to record the renewed thumbnail image file at the same address position as that of the thumbnail image file recorded on the disc 3, it can divide the file and record it discretely. Furthermore, it is possible to record the renewed thumbnail image file in the area continuously possible for the reproduction where seek of the reproduction head does not occur at the reproduction time in a totally different recordable area.

Further, the CPU 10, when the operation unit 4 is operated and the actuating signal S1 such as the image reproduction command and the like is inputted, controls the media drive unit 15 in response to this, thereby giving to the modulation data D3 of the thumbnail image file SNF read from the disc 3 the same processing as described above, and sends the acquired thumbnail image file SNF to the SDRAM 24.

Further, the CPU 10, after that, performs the buffering of the thumbnail image file SNF supplied in the SDRAM 24, and after that, reads in order the thumbnail image data SNP within the thumbnail image file SNF in a predetermined timing, and sends it to the camera/display block 8 through the SDRAM interface 20 and the serial interface 22 in that order.

The CPU 10 performs the image expansion processing in conformity with the predetermined image expansion system, for example, such as JPEG and the like, the digital/analogue conversion processing, and the like in the signal processing unit of the camera/display block 8, and sends the thumbnail image SNP thus acquired to the display unit 8A of the camera/display block 8. This allows, as shown in FIG. 4, a reproduction image selection screen 29 for selecting the thumbnail image SNF to be displayed in the display unit 8A of the camera/display block 8, and for example, the thumbnail images SNP 1 to SNP 4 are displayed in a list within the reproduction image selection screen 29.

(3) Recording and Reproduction Control of the Thumbnail Image File SNF According to the Present Embodiment (3-1) File Structure of the Thumbnail Image File SNF First, the file structure of the thumbnail image file SNF in this recording and reproducing apparatus 1 will be described.

In this file structure of the thumbnail image file SNF, as shown in FIG. 6A, there are provided individual areas $30_1$, $32_2$, and $33_n$ in which each thumbnail image is stored. Further, as shown in FIG. 6B, in each individual area, there are provided a thumbnail image data area stored with the substance of the thumbnail image data and a header area showing the attribute of the individual area. In the header area, there is provided a data storage flag showing whether or not the thumbnail image data is stored in the thumbnail image data area. Further, in the present embodiment, the data size of the individual area is fixed, and an access to the data of the predetermined individual area is easily made possible by reading from the position of the value which multiplies the predetermined file size by the predetermined number of files from the starting head of the thumbnail image file. Incidentally, by storing the data size of the individual area in the head area of the individual area, it is also possible to make the capacity of the thumbnail image data variable. Furthermore, without providing the header within each area, the management information to manage the entire thumbnail image file is further provided, so that it may be determined whether or not the thumbnail image is stored within the individual area by the management information. Even in case the management information is provided separately, it goes without saying that whether or not the data size of the thumbnail image is fixed can be selected as needed.

At the starting head of the thumbnail image file SNF, there is provided a reproduction time screen display area 30 ($30_1$ to $30_4$) to store the thumbnail image data SNP of the thumbnail image displayed first in a list within a reproduction image selection screen 29, and the thumbnail image data SNP displayed first in a list within the reproduction image selection screen 29 can be put into this reproduction time screen display area 30 and stored.

Further, followed by the reproduction time screen display area 30, there are provided reproduction time previous screen display areas 31 ($31_1$ to $31_4$) to store the thumbnail image data SNP displayed in a list at one screen portion ahead of the thumbnail image data SNP displayed first in a list within the reproduction image selection screen 29, and the thumbnail image data SNP displayed in a list at one screen portion ahead the sun main image data SNP displayed first in a list within the reproduction image selection screen 29 can be put into this reproduction time previous screen display area 31 and stored.

Further, followed by the reproduction time previous screen display area 31, there are provided reproduction time next screen display areas 32 ($32_1$ to $32_4$) to store the thumbnail image data SNP displayed in a list at one screen portion after the thumbnail image data SNP displayed first in a list within the reproduction image selection screen 29, and the thumbnail image data SNP displayed in a list at one screen portion after the thumbnail image data SNP displayed first in a list within the reproduction image selection screen 29 can be put into this reproduction time next screen display area 32 and stored.

Further, followed by the reproduction time next screen display area 32, there are provided normal display areas 33 ($33_1$ to $33_n$) to store the thumbnail image data SNP arranged in order of the image file PF generated, and the thumbnail image data SNP is arranged in order of the image file PF generated, and can be put into this normal display area 33 and stored.

(3-2) Recording Control and Reproduction Control of the Thumbnail Image File SNF Next, the recording control and the reproduction control of the thumbnail image file SNF at the camera mode time in this recording and reproducing apparatus 1 will be described.

In this recording and reproducing apparatus 1, at the recording time, the thumbnail image data SNP within the thumbnail image file SNF is lined up and stored in generating order of the image file PF, and at the same time, the predetermined number of newly generated thumbnail image data SNP is redundantly stored at the starting head of the thumbnail image file SNF, and after that, the thumbnail image file SNF is recorded in the disc 3, so that, at the reproduction time, the thumbnail image SNP can be displayed in the display unit 8A before all the thumbnail image files SNF are read.

In reality, the CPU 10, in the initial period state in which the thumbnail image file SNF is not recorded in the disc 3, and when the operation unit 4 is operated and the actuating signal S1 such as an image recording command and the like is inputted, and the actuating signal S1 such as an image capture command, and the like is inputted, controls the camera/display block 8 in response to this, so that the same processing as the camera mode is executed, and the main image data PD thus acquired is taken into the RAM 12 through the serial interface 22 so as to be expanded, thereby generating the image file PF based on the main image data PD. Further, the CPU 10 generates the thumbnail image file SNF on the RAM 12, and the thumbnail image data SNP generated based on the main image data PD expanded on the RAM 12 is stored in order into the thumbnail image file SNF.

At this time, the CPU 10, as shown in FIG. 7A, when the main image data PD based on the captured main image is a main image data PD 1 captured in a first image, stores a thumbnail image data SNP 1 based on the main image data PD 1 into a reproduction time screen display area $30_1$ and a normal display area $33_1$ within the thumbnail image file SNF. At this time, a data storage flag within the header area of the individual area as shown in FIG. 6B is changed to a completion of a thumbnail image storage. Similarly, the thumbnail image data SNP changes the data storage flag within the header area of the individual area stored in the thumbnail image data area to a completion of thumbnail image storage.

Further, the CPU 10, as shown in FIG. 7B, when the main image data PD based on the captured main image is a main image data PD 2 captured in a second image, stores a thumbnail image data SNP 2 based on the main image data PD 2 into a reproduction time screen display area $30_2$ and a normal display area $33_2$ within the thumbnail image file SNF.

Further, the CPU 10, as shown in FIG. 7C, when the main image data PD based on the captured main image is a main image data PD 3 captured in a third image, stores a thumbnail image data SNP 3 based on the main image data PD 3 into a reproduction time screen display area $30_3$ and a normal display area $33_3$ within the thumbnail image file SNF.

Further, the CPU 10, as shown in FIG. 7D, when the main image data PD based on the captured main image is a main image data PD 4 captured in a fourth image, stores a thumbnail image data SNP 1 to SNP 4 based on the main image data PD 4 into a reproduction time screen display area $30_4$ and a normal display area $33_4$ within the thumbnail image file SNF.

Further, the CPU 10, as shown in FIG. 7E, when the main image data PD based on the captured main image is a main image data PD 5 captured in a fifth image, copies the thumbnail image data SNP 1 to SNP 4 of the reproduction time screen display area 30 into the reproduction time previous screen display area 31. After that, the CPU 10 copies the thumbnail image data SNP 1 to SNP 4 of the reproduction time screen display area 30 into a reproduction next screen display area 32, and further after that, erases the thumbnail image data SNP 1 to SNP 4 stored in the reproduction time screen display area 30, and after that, stores a thumbnail image data SNP 5 based on the main image data PD 5 into the reproduction time screen display area $30_1$ and a normal display area $33_5$ with the thumbnail image file SNF. In this case, the erasing of the thumbnail image data can be performed only by rewriting the data storage flag provided in the header area within the individual area into a data storage state without erasing the thumbnail image within the individual area. Of course, it does not matter if the thumbnail image is actually erased.

By so doing, the CPU 10, when the reproduction time image display area 30 of the thumbnail image file SNF is all stored, copies the thumbnail image data SNP of the reproduction time image display area 30 into the reproduction time previous screen display area 31. Further, when the reproduction time screen display area 30 of the thumbnail image file SNF is all stored, the CPU 10, in case the thumbnail image data SNP is not stored in a reproduction time next screen display area 32, copies the thumbnail image data SNP of the reproduction time screen display area 30 into the reproduction time next screen display area 32.

Further, the CPU 10, as shown in FIGS. 7F, 7G, and 7H, when the main image data PD based on the captured main image is main image data PD 6 to PD 8 captured in sixth to eighth images, stores the thumbnail image data SNP 6 to SNP 8 based on the main image data PD 6 to PD 8 into the corresponding reproduction time screen display areas $30_2$ to $30_4$ and normal display areas $33_6$ to $33_8$ within the thumbnail image file SNF.

Further, the CPU 10, as shown in FIG. 7I, when the main image data PD based on the captured main image is a main image data PD 9 captured in a ninth image, copies thumbnail image data SNP 5 to SNP 8 of the reproduction time screen display area 30 into the reproduction time previous screen display area 31, and after that, erases the thumbnail image data SNP 5 to SNP 8 stored in the reproduction time screen display area 30, and after that, stores a thumbnail image data SNP 9 based on the main image data PD 9 into the reproduction time screen display area $30_1$ and a normal display area $33_9$ within the thumbnail image file SNF.

Further, the CPU 10, as shown in FIGS. 7J, 7K, and 7l, when the main image data PD based on the captured main image is main image data PD 10 to PD 12 captured in tenth to twelfth images, stores thumbnail image data SNP 10 to SNP 12 based on the main image data PD 10 to PD 12 into the corresponding reproduction time screen display areas $30_2$ to $30_4$ and normal display areas $33_{10}$ to $33_{12}$ within the thumbnail image file SNF.

Further, the CPU 10, as shown in FIG. 7M, when the main image data PD based on the captured main image is a main image data PD 13 captured in a thirteenth image, copies the thumbnail image data SNP 10 to SNP 12 of the display time screen display area 30 into the reproduction time previous screen display area 31, and after that, erases the thumbnail image data SNP 10 to SNP 12 stored in the reproduction time screen display area 30, and after that, stores the thumbnail image data SNP 13 based on the main image data PD 13 into the reproduction time screen display area $30_1$ and a normal display area $33_{13}$ within the thumbnail image file SNF.

Further, the CPU 10, as shown in FIGS. 7N, 7O, and 7P, when the main image data PD based on the captured main image is main image data PD 14 to PD 16 captured in fourteenth to sixteenth images, stores thumbnail image data SNP 14 to SNP 16 based on the main image data PD 14 to PD 16 into the corresponding reproduction time screen display areas $30_2$ to $30_4$ and normal display areas $33_{14}$ to $33_{16}$ within the thumbnail image file SNF.

The CPU 10, when the operation unit 4 is operated and every time the actuating signal S1 such as the image capture command and the like is inputted, can store the thumbnail image data SNP generated based on the main image data PD into the reproduction time screen display area 30 of the thumbnail image file SNF and the normal display area 33 in that order.

The CPU 10, when the operation unit 4 is operated and the actuating signal S1 such as a stop command to stop the image recording command and the like is inputted, performs the same processing as described above, thereby sending the acquired modulation data D3 of the thumbnail image file SNF to the disc 3. This allows the modulation data 3 to be recorded on the address position designated by the CPU 10 on the disc 3.

In the meantime, in reality, the CPU 10, as described above, in a state in which the main image data PD is captured up to the sixteenth image and the thumbnail image file SNF storing the thumbnail image data SNP 1 to SNP 16 is recorded in the disc 3, and when the operation unit 4 is operated and the actuating signal S1 such as the image reproduction command and the like is inputted, controls the media drive unit 15 in response to this, so that the modulation data D3 of the thumbnail image file SF is given the same processing as described above from the disc 3 through the reproduction time screen display area 30, the reproduction time previous screen display area 31, the reproduction time next screen display area 32, and the normal display area 33 in that order, and the acquired thumbnail image file SNF is sent to the SDRAM 24 in the same order as described above.

The CPU 10 can read the thumbnail image data SNP 13 to SNP 16 in order from the SDRAM 24 in the timing of having completed the buffering of the thumbnail image data SNP 16 of the reproduction time screen display area 30 of the supplied thumbnail image file SNF.

Figures 8A, 8B:
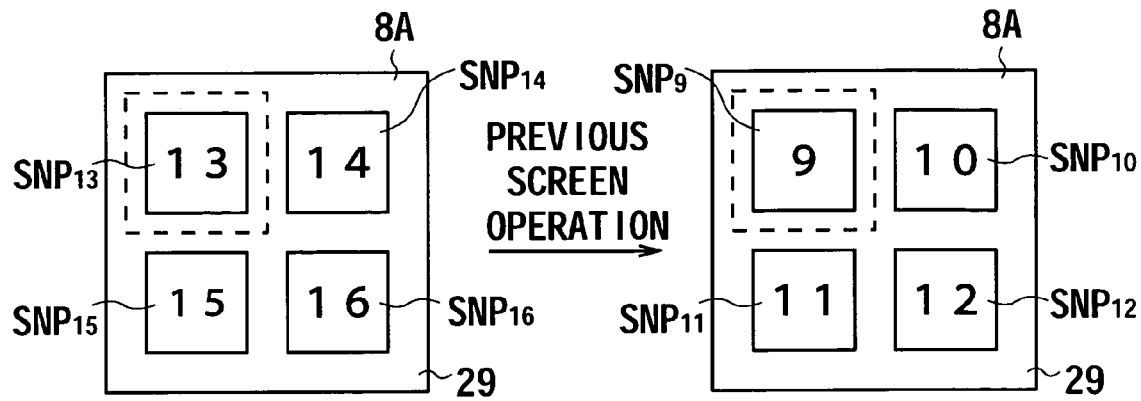
FIGS. 8A to 8D are conceptual illustrations provided to explain shifting of the reproduction image selection screen.

The CPU 10 performs the same processing as described above for the thumbnail image data SNP 13 supplied in order through the SDRAM interface 20 and the serial interface 22 by controlling the camera/display block 8, and sends the acquired thumbnail images SNP 13 to SNP 16 to the display unit 8A of the camera/display block 8. This allows, as shown in FIG. 8A, the reproduction image selection screen 29 for selecting the thumbnail image SNP to be displayed in the display unit 8A of the camera/display block 8, and the thumbnail images SNP 13 to SNP 16 are displayed in a list within the reproduction image selection screen 29.

Further, by so doing, the CPU 10, even when the operation unit 4 is operated and the actuating signal S1 such as a previous screen display command and the like is inputted, can read the thumbnail image data SNP 9 to SNP 12 in order from the SDRAM 24 in the timing of having completed the buffering of the thumbnail imaged data SNP 12 of the reproduction time previous screen display area 31 of the supplied thumbnail image file SNF.

After that, the CPU 10 performs the same processing as described above, so that, as shown in FIG. 8B, the reproduction image selection screen 29 for selecting the thumbnail image SNP is displayed in the display unit 8A of the camera/display block 8, and the thumbnail images SNP 9 to SNP 12 are displayed in a list within the reproduction image selection screen 29.

Further, by so doing, the CPU 10, even when the operation unit 4 is operated and the actuating signal S1 such as a next screen display command and the like is inputted, can read the thumbnail image data SNP 1 to SNP 4 in order from the SDRAM 24 in the timing of having completed the buffering of the thumbnail image data SNP 4 of the reproduction time next screen display area 32 of the supplied thumbnail image file SNF.

Figures 8C, 8D:
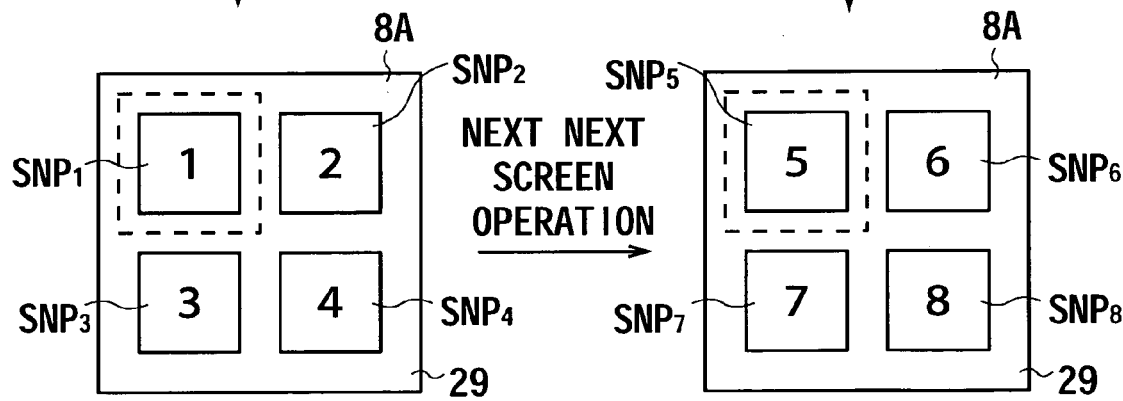

After that, the CPU 10 performs the same processing as described above, so that, as shown in FIG. 8C, the reproduction image selection screen 29 for selecting the thumbnail image SNP is displayed in the display unit 8A of the camera/display block 8, and the thumbnail images SNP 1 to SNP 4 are displayed in a list within the reproduction image selection screen 29.

Incidentally, the CPU 10, for example, when the operation unit 4 is operated and the actuating signal S1 such as the previous screen display command and the like is inputted, can read the thumbnail image data SNP 5 to SNP 8 in order from the SDRAM 24 in the timing of having completed the buffering of the thumbnail image data SNP 8 of the normal display area 33 of the supplied thumbnail image file SNF.

After that, the CPU 10 performs the same processing as described above, so that, as shown in FIG. 8D, the reproduction image selection screen 29 for selecting the thumbnail image SNP is displayed in the display unit 8A of the camera/display block 8, and the thumbnail images SNP 5 to SNP 8 are displayed in a list within the reproduction image selection screen 29.

By so doing, the CPU 10, when the operation unit 4 is operated and the actuating signal S1 such as the image reproduction command and the like is inputted, the thumbnail image SNF, in which the reproduction time screen display area 30 storing the thumbnail image data SNP displayed first in a list within the reproduction image selection screen 29 is provided at the starting head, is read from the disc 3, and the thumbnail image SNP based on the thumbnail image data SNP can be displayed in the display unit 8A.

Figure 9:
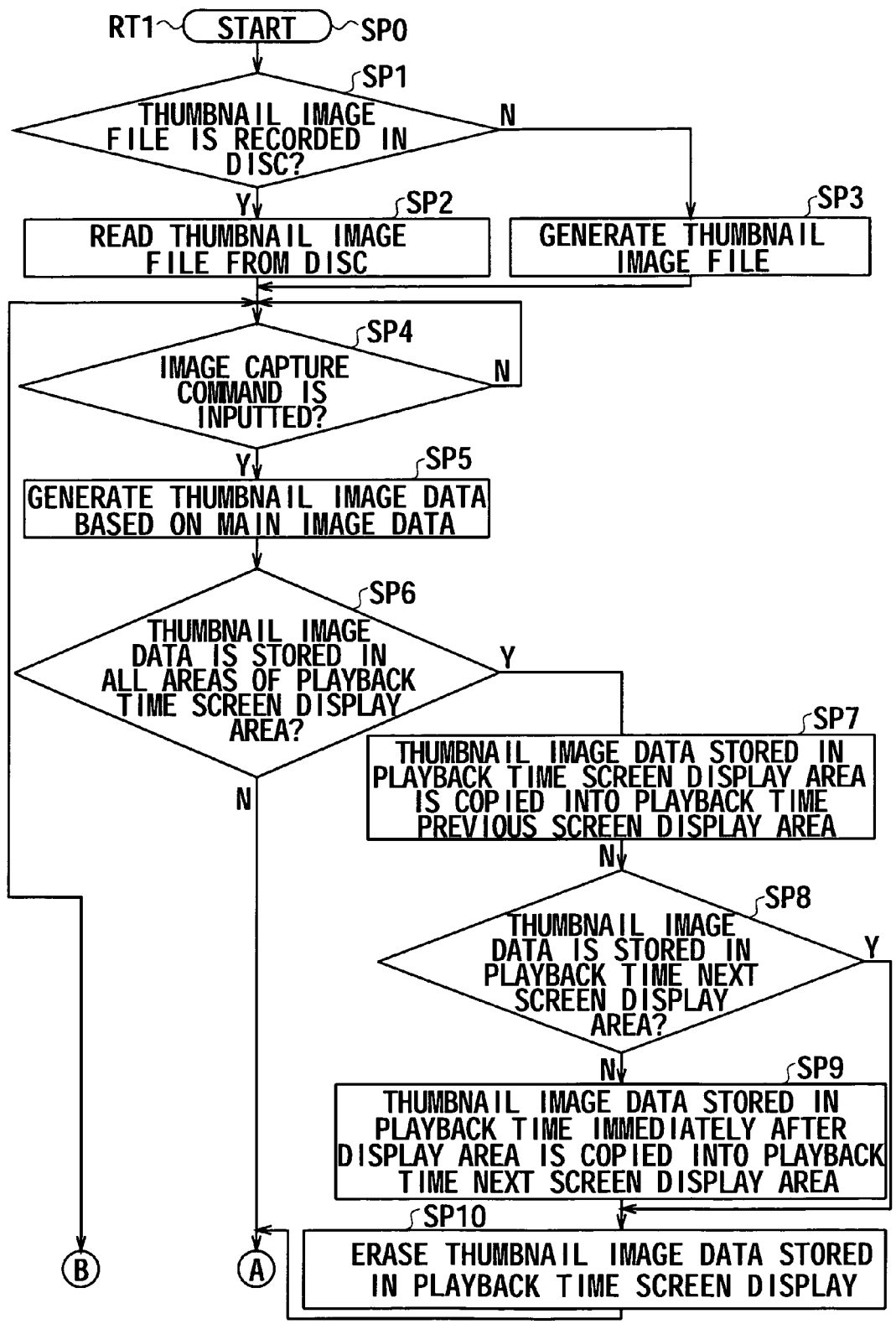
FIG. 9 is a flowchart provided to explain a recording control processing procedure.
Figure 10:
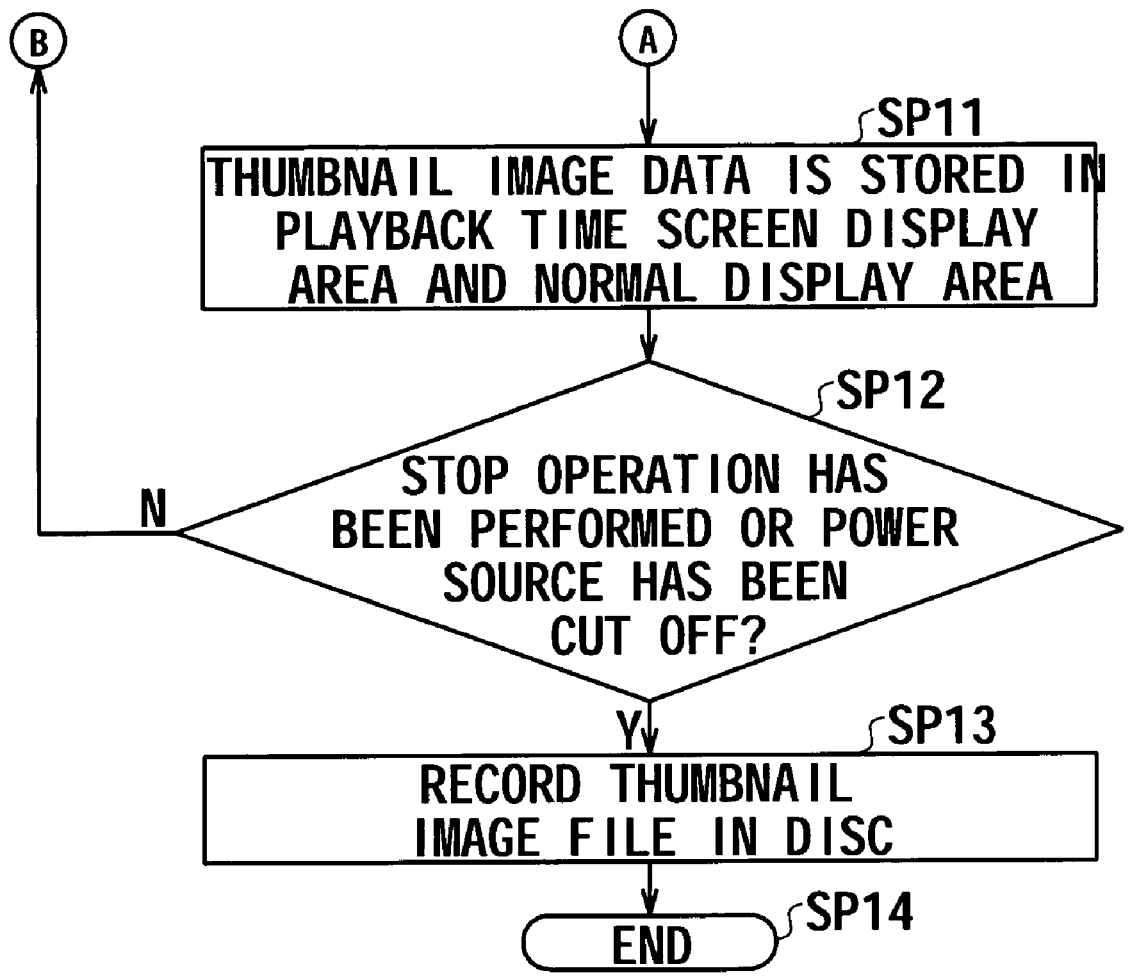
FIG. 10 is a flowchart provided to explain a recording control processing procedure.

(3-3) Recording Control Processing Procedure and Reproduction Control Processing Procedure Here, the recording control processing by the CPU 10 as described above is performed according to a recording control processing procedure RT1 shown in FIGS. 9 and 10 based on the control program recorded and stored within the ROM 11.

That is, the CPU 10, for example, when the operation unit 4 is operated and the actuating signal S1 such as the image recording command and the like is inputted, starts this recording control processing procedure RT1 at step SP0, and at the subsequent step SP1, determines whether or not the thumbnail image file SNF is recorded in the disc 3. The CPU 10, when acquiring a negative result in this step SP1, advances to step SP2, and reads the thumbnail image file SNF from the disc 3, and takes it into the RAM 12 so as to be expanded. On the contrary, when acquiring a negative result, the CPU 10 advances to step SP3, and generates the thumbnail image file SNF, and takes it into the RAM 12 so as to be expanded.

Subsequently, the CPU 10 advances to step SP4, and determines whether or not the operation unit 4 is operated and the actuating signal S1 such as the image capture command and the like is inputted. The CPU 10 waits for the operation of the operation unit 4 and the input of the actuating signal S1 such as the image capture command and the like at this step SP4, and when an affirmative result is acquired in due time with the operation unit 4 operated, the CPU 10 advances to step SP5, and generates the thumbnail image data SNP based on the image data PD.

Subsequently, the CPU 10 advances to step SP6, and determines whether or not the thumbnail image data SNP is stored in all the areas of the reproduction time screen display area 30 of the thumbnail image file SNF. The CPU 10, when acquiring a negative result at this step SP6, advances to step SP11. On the contrary, when an affirmative reply is acquired, the CPU 10 advances to step SP7, and copies the thumbnail image data SNP of the reproduction time screen display area 30 into the reproduction time previous screen display area 31.

Subsequently, the CPU 10 advances to step SP8, and determines whether or not the thumbnail image data SNP is stored in the reproduction time next screen display area 32 of the thumbnail image file SNF. The CPU 10, when acquiring an affirmative result at this step SP8, advances to step SP10. On the contrary, when a negative result is acquired, the CPU 10 advances to step SP9, and copies the thumbnail image data SNP of the reproduction time screen display area 30 into the reproduction time next screen display area 32.

Subsequently, the CPU 10 advances to step SP10, and erases the thumbnail image data SNP stored in the reproduction time screen display area 30 of the thumbnail image file SNF.

After that, in due time, the CPU 10 advances to step SP11, and stores the thumbnail image data SNP generated at step SP5 into the reproduction time screen display area 30 of the thumbnail image file SNF and the normal display area 33.

Subsequently, the CPU 10 advances to step SP12, and based on the actuating signal S1 from the operation unit 4, determines whether or not the user has performed the operation necessary to stop (hereinafter, this is referred to as stop operation) the image recording operation or the power source of this recording and reproducing apparatus 1 has been cut off, and when acquiring a negative result, returns to step SP4, and after that, repeats the same processing for steps SP4 to SP12. The CPU 10, when acquiring an affirmative reply at step SP12 in due time with the stop operation performed by the user, advances to step SP13, and records the thumbnail file SNF in the disc 3, and after that, advances to step SP14, and completes the recording control processing procedures RT1.

Figure 11:
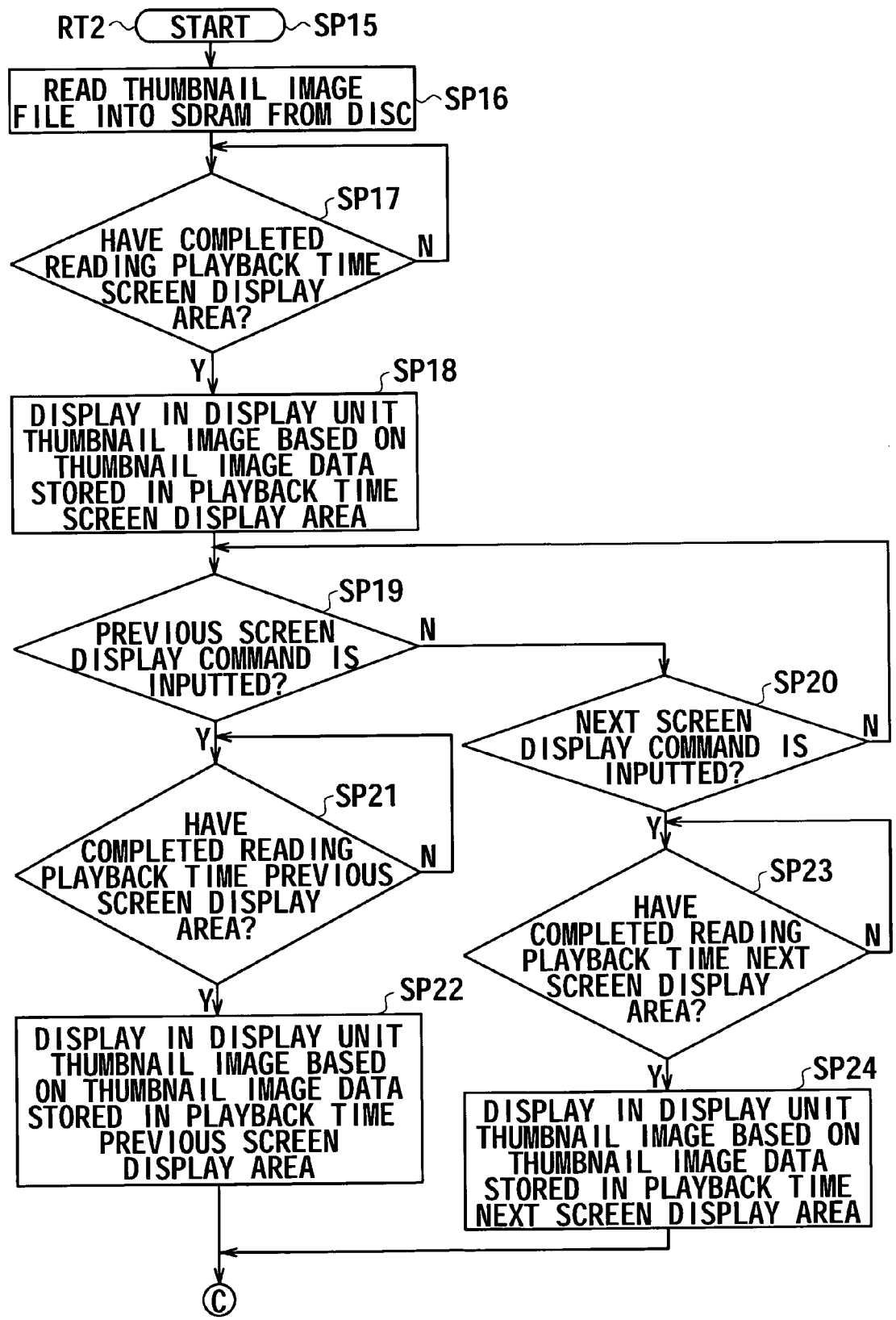
FIG. 11 is a flowchart provided to explain the reproduction control processing procedure.
Figure 12:
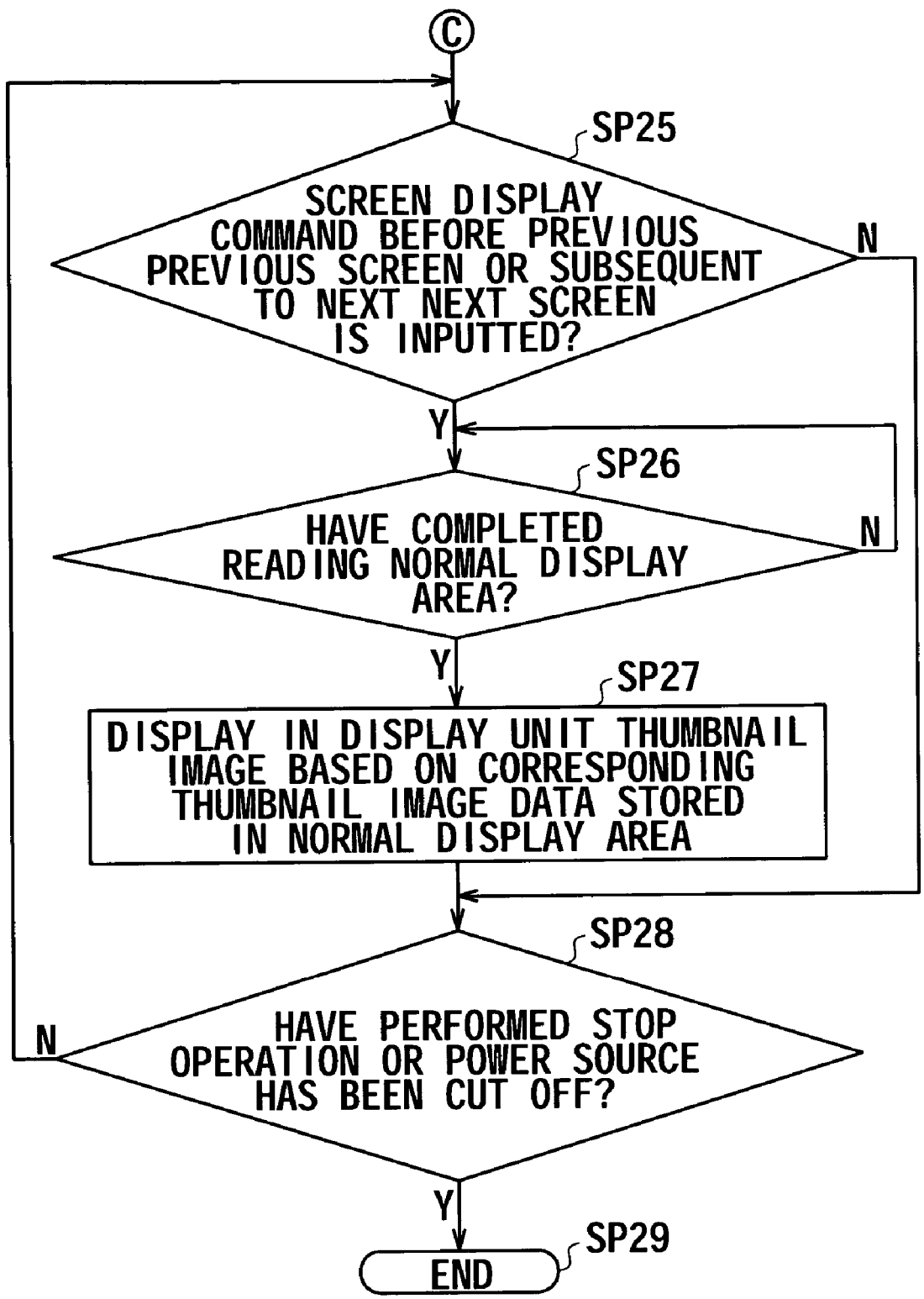
FIG. 12 is a flowchart provided to explain the reproduction control processing procedure.

In the meantime, the reproduction control processing by the CPU 10 as described above is performed according to a reproduction control processing procedure RT2 shown in FIGS. 11 and 12 based on the control program stored in the ROM 11.

That is, the CPU 10, for example, when the operation unit 4 is operated and the actuating signal S1 such as the image reproduction command and the like is inputted, starts the reproduction control processing procedure RT2 at step SP15, and at the subsequent step SP16, reads the thumbnail image file SNF from the disc 3 into the SDRAM 24.

Subsequently, the CPU 10 advances to step SP17, and determines whether or not the reading of the thumbnail image file SNF into the SDRAM 24 of the reproduction time screen display area 30 has been completed. The CPU 10 waits for the completion of the reading of the thumbnail image file SNF into the SDRAM 24 of the reproduction time screen display area 30 at this step SP17, and when an affirmative result is acquired in due time with the reading into the SDRAM 24 completed, advances to step SP18, and displays in the display unit 8A the thumbnail image SNP based on the thumbnail image data SNP stored in the reproduction time screen display area 30.

Subsequently, the CPU 10 advances to step SP19, and for example, determines whether or not the operation unit 4 is operated and the actuating signal S1 such as the previous screen display command and the like is inputted. The CPU 10, when acquiring a negative result at this step SP19, advances to step SP20, and for example, determines whether or not the operation unit 4 is operated and the actuating signal S1 such as the next screen display command and the like is inputted. The CPU 10, when acquiring a negative result at this step SP20, returns to step SP19, and after that, repeats the same processing for steps 19 and 20.

In contrast to this, the CPU 10, when acquiring an affirmative result at step SP19, advances to step SP21, and determines whether or not the reading of the reproduction time previous screen display area of the thumbnail image file SNF into the SDRAM 24 has been completed. The CPU 10, at this step SP21, waits for the completion of the reading of the reproduction time previous screen display area 31 of the thumbnail image file SNF into the SDRAM 24, and when acquiring an affirmative result in due time with the reading into the SDRAM 24 completed, advances to step SP22, and displays in the display unit 8A the thumbnail image SNP based on the thumbnail image data SNP stored in the reproduction time previous screen display area 31.

Further, in contrast to this, the CPU 10, when acquiring an affirmative result at step SP20, advances to step SP23, and determines whether or not the reading of the reproduction time next screen display area 32 of the thumbnail image file SNF into the SDRAM 24 has been completed. The CPU 10, at this step SP23, waits for the completion of the reading of the reproduction time next screen display area 32 of the thumbnail image file SNF into the SDRAM 24, and when acquiring an affirmative result in due time with the reading into the SDRAM 24 completed, advances to step SP24, and displays in the display unit 8A the thumbnail image SNP based on the thumbnail image data SNP stored in the reproduction time next screen display area 32.

Subsequently, the CPU 10 advances to step SP25, and for example, determines whether or not the operation unit 4 is operated and the actuating signal S1 such as the display command before a previous screen or subsequent to a next screen, and the like is inputted. The CPU 10, when acquiring a negative result at this step SP25, advances to step SP28, and in contrast to this, when acquiring an affirmative result, advances to step SP26, and determines whether or not the reading of the normal display area 33 of the thumbnail image file SNF into the SDRAM 24 has been completed. The CPU 10, at this step SP26, waits for the completion of the reading of the normal display area 33 of the thumbnail image file SNF into the SDRAM 24, and when acquiring an affirmative result in due time with the reading into the SDRAM 24 completed, advances to step SP27, and displays in the display unit 8A the thumbnail image SNP based on the corresponding thumbnail image data SNP stored in the normal display area 33.

Subsequently, the CPU 10 advances to step SP28, and based on the actuating signal S1 from the operation unit 4, determines whether or not the user has performed the operation necessary to stop (hereinafter, this is referred to as stop operation) the image reproduction operation or the power source of this recording and reproducing apparatus 1 has been cut off, and when acquiring a negative result, returns to step SP25, and after that, repeats the same processing for steps SP25 to SP28. The CPU 10, when acquiring an affirmative reply in due time at step SP28 with the stop operation performed by the user, advances to step SP29, and completes the reproduction control processing procedures RT2.

(4) Operation and Effect According to the Present Embodiment

In the structure as described above, in this recording and reproducing apparatus 1, at the recording time, the thumbnail image data SNP displayed first in a list within the reproduction image selection screen 29 is always recorded in the starting head of the thumbnail image file SNF.

Further, in this recording and reproducing apparatus 1, at the reproduction time, the thumbnail image SNF, in which the reproduction time screen display area 30 storing the thumbnail image data SNP displayed first in a list within the reproduction image selection screen 29 is provided at the starting head, is read from the disc 3, and the thumbnail image SNP based on the thumbnail image data SNP is displayed in the display unit 8A.

Consequently, in this recording and reproducing apparatus 1, the thumbnail image SNP based on the thumbnail image data SNP is displayed in the display unit 8A in the timing of having completed the buffering of the thumbnail image data SNP of the reproduction time screen display area 30 of the thumbnail image file SNF into the SDRAM 24, so that the thumbnail image can be quickly displayed in the display unit 8A.

According to the structure as described above, at the recording time, the thumbnail image data SNP displayed first in a list within the reproduction image selection screen 29 is always recorded in the starting head of the thumbnail image file SNF, so the thumbnail image SNP based on the thumbnail image data SNP is displayed in the display unit 8A in the timing of having completed the buffering of the thumbnail image data SNP of the reproduction time screen display area 30 of the thumbnail image file SNF into the SDRAM 24, so that the thumbnail image can be quickly displayed in the display unit 8A, and thus, the recording and reproducing apparatus capable of exceptionally improving the usability can be realized.

Further, at the reproduction time, the thumbnail image SNF, in which the reproduction time screen display area 30 recording the thumbnail image data SNP displayed first in a list within the reproduction image selection screen 29 is provided at the starting head, is read from the disc 3, and the thumbnail image SNP based on the thumbnail image data SNP is displayed in the display unit 8A, so that the thumbnail image SNP based on the thumbnail image data SNP is displayed in the display unit 8A in the timing of having completed the buffering of the thumbnail image data SNP of the reproduction time screen display area 30 of the thumbnail image file SNF into the SDRAM 24, so that the thumbnail image can be quickly displayed in the display unit 8A, and thus, the recording and reproducing apparatus capable of exceptionally improving the usability can be realized.

(5) Other Embodiments

In the above described embodiment, while a description has been made on the case where the present invention is applied to the recording and reproducing apparatus corresponding to the current MD and the first and second next generation MDs, the present invention is not limited to this, and for example, can be widely applied to the recording and reproducing apparatus with various disc media other than these MDs taken as the recording medium.

Further, in the above described embodiment, while a description has been made on the case where the thumbnail image SNP is displayed as the reproduction image (in the reproduction image selection screen 29), the present invention is not limited to this, and the number of such thumbnail images SNP displayed in the reproduction image selection screen 29 may be other than four.

Further, in the above described embodiment, while a description has been made on the case where the storage areas of the reproduction time screen display area 30, the reproduction time previous screen display area 31, and the reproduction time next screen display area 32 have been made four, the present invention is not limited to this, and the storage areas may be other than four.

Further, in the above described embodiment, while a description has been made on the case where the thumbnail image data SNP of the reproduction time screen display area 30 is copied into the reproduction time previous screen display area 31 in case the reproduction time screen display area 30 of the thumbnail image file SNF has been all stored, the present invention is not limited to this, and for example, the individual areas $30_1$, $30_2$ and $30_3$ of the reproduction time screen display area 30 can be copied similarly to individual areas $30_2$, $30_3$ and $30_4$, so that the thumbnail image data SNP may be stored and controlled so as to be shifted, and in addition to this, the thumbnail image data can be stored in various formats.

Further, in the above described embodiment, while a description has been made on the case where the thumbnail image SNP based on the thumbnail image data SNP is displayed in the display unit 8A in the timing of having completed the buffering of the thumbnail image data SNP of the reproduction time screen display area 30 of the thumbnail image file SNF into the SDRAM 24, the present invention is not limited to this, and for example, the thumbnail image SNP based on the thumbnail image data SNP may be displayed in the display unit 8A without reading and buffering the thumbnail image data SNP of the reproduction time screen display area 30 of the thumbnail image file SNF into SDRAM 24, and in addition to this, the thumbnail image SNP can be display in the display unit 8A in various timing.

Further, in the above described embodiment, while a description has been made on the case where the thumbnail image file SNF has been recorded at the address position continued with the reproduction time screen display area 30, the reproduction time previous screen display area 31, the reproduction time next screen display area 32, and the normal display area 33, the present invention is not limited to this, and for example, the thumbnail image file SNF may be recorded at separate addresses of the reproduction time screen display area 30, the reproduction time previous screen display area 31, the reproduction time next screen display area 32, and the normal display area 33, respectively.

Further, in the above described embodiment, while a description has been made on the case where the thumbnail image file SNF has been recorded at the address position continued with the reproduction time screen display area 30, the reproduction time previous screen display area 31, the reproduction time next screen display area 32, and the normal display area 33, the present invention is not limited to this, and for example, the thumbnail image file SNF may be recorded at the address position continued only with the reproduction time screen display area 30 and the reproduction time previous screen display area 31, and in brief, it may be all right if the reproduction time screen display area 30 is recorded at the predetermined address position.

Further, in the above described embodiment, while a description has been made on the case where the thumbnail image file SNF is generated, the present invention is not limited to this, but the image data of the thumbnail image displayed first in a list may be collectively recorded at the predetermined position.

Further, in the above described embodiment, while a description has been made on the case where the thumbnail image file SNF is expanded on the RAM 12, and the thumbnail image data SNP is stored, the present invention is not limited to this, and for example, can be applied to a storage mechanism quick in reading and writing speed of the data comparing to other various disc media such as a semiconductor memory and the like.

Further, in the above described embodiment, while a description has been made on the case where the thumbnail image SNP based on the newly captured main image data PD is displayed first in a list, the present invention is not limited to this, and for example, the thumbnail image SNP based on the image data of the image having a large data amount may be displayed first in a list or a preferred image is selected, and the thumbnail image SNP based on the image data of that preferred image may be displayed first in a list, and in addition to this, various setting and the thumbnail images desired by the user can be displayed first in a list.

Further, in the above described embodiment, while a description has been made on the case where the thumbnail image file SNF is expanded in the RAM 12 and the thumbnail image data SNP is stored, and then, it is recorded in the disc 3, the present invention is not limited to this, but the thumbnail image data SNP may be stored in the thumbnail image file SNF of the disc 3 as it is and recorded without expanding the thumbnail image file SNF in the RAM 12, and in brief, the image data of the predetermined thumbnail image displayed first in a list may be collectively recorded in a predetermined area.

Further, in the above described embodiment, while a description has been made on the case where the image file of the EXif format generated based on the image of the still image is recorded, the present invention is not limited to this, but may be applied to a file format for recording other various main imaged data and the additional information.

Further, in the above described embodiment, while the thumbnail image SNP based on the newly captured main image data PD is generated so as to be stored into the thumbnail image file SNF, the thumbnail image may be taken from the main image data PD already recorded in the disc media and the thumbnail image SNP already generated based on that main image data PD so as to be added and stored in the thumbnail image file SNF. In this case, the thumbnail image data SNP accompanied and recorded in the main image data PD recorded in the EXif format may be taken and acquired so as to be stored into the thumbnail image file SNF.

It should be understood by those skilled in the art that various modifications, combinations, sub-combinations and alternations may occur depending on design requirements and other factors insofar as they are within the scope of the appended claims or the equivalents thereof.

What is claimed is:

1. A recording and reproducing apparatus to record image data in a disc media and reproduce the image data, comprising:
   means for recording the image data in said disc media;
   means for reproducing the image data from said disc media;
   means for acquiring a thumbnail image of the image data;
   means for storing a thumbnail image file including a plurality of thumbnail images, said thumbnail image file containing a first data area and a second data area;
   means for controlling storage of the thumbnail image in the thumbnail image file by copying the thumbnail image into the first data area and into the second data area of the thumbnail image file; and
   means for recording the thumbnail image file in said disc media.

2. The recording and reproducing apparatus according to claim 1, further comprising:
   means for generating the thumbnail image based on said image data.

3. The recording and reproducing apparatus according to claim 1, wherein a newly acquired thumbnail image is recorded at a starting head position of said thumbnail image file.

4. The recording and reproducing apparatus according to claim 1, wherein a newly acquired thumbnail image is added and recorded to the first data area in said thumbnail image file every time a thumbnail image is newly acquired.

5. The recording and reproducing apparatus according to claim 4, wherein, when a first instruction to display the thumbnail image is received, one or more thumbnail images recorded in the first data area are displayed first, and when a second instruction to display the thumbnail image is received during the display of said first data area, one or more thumbnail images recorded in the second data area in said thumbnail image file are displayed.

6. The recording and reproducing apparatus according to claim 1, further comprising:
   a thumbnail image generating unit configured to generate the thumbnail image based on said image data.

7. The recording and reproducing apparatus according to claim 1, wherein said thumbnail image file includes a header data area, said header data area includes a data storage flag that indicates the completion of the recording the thumbnail image in said disc media.

8. The recording and reproducing apparatus according to claim 1, wherein said means for controlling storage of the thumbnail image copies a first plurality of thumbnail images from the first data area to a third data area in response to an instruction to display a second plurality of thumbnail images.

9. The recording and reproducing apparatus according to claim 8, wherein said means for controlling storage of the thumbnail image copies the third plurality of thumbnail images from the third data area to a fourth data area in response to an instruction to display a third plurality of thumbnail images.

10. A recording and reproducing apparatus to record image data in a disc media and reproduce the image data, comprising:
    means for recording the image data in said disc media;
    means for reproducing the image data from said disc media;
    means for acquiring a thumbnail image of the image data;
    means for storing a thumbnail image file including a plurality of thumbnail images, said thumbnail image file includes a first area in which said thumbnail image is added and recorded every time a new thumbnail image is acquired, and a second area overwritten by the acquired thumbnail image; and
    means for controlling storage of the thumbnail image in the thumbnail image file.

11. The recording and reproducing apparatus according to claim 10, wherein, before said thumbnail image is recorded in said second data area, a second thumbnail image recorded in said second data area is copied into a third data area in said thumbnail image file different from said second area, and said second data area is overwritten.

12. A recording and reproducing method of recording or reproducing image data in a disc media implemented in a recording apparatus, comprising:
    generating, at the recording apparatus, a thumbnail image of the image data
    recording, at the recording apparatus, the image data in said disc media;
    collecting, at the recording apparatus, said thumbnail image in a thumbnail image file, said thumbnail image file including a plurality of thumbnail images, said thumbnail image file containing a first data area and a second data area;
    copying, at the recording apparatus, the thumbnail image into the first data area and into the second data area of said thumbnail image file; and
    recording, at the recording apparatus, said thumbnail image file in said disc media.

13. The recording and reproducing method according to claim 12, further comprising:
    receiving an instruction to display the thumbnail images in a list, and
    displaying the thumbnail images in the list, wherein image data of the thumbnail image first displayed in the list is collected from a starting head of the said disc media.

14. The recording and reproducing method according to claim 13, wherein the thumbnail image first displayed in the list is read from said disc media in advance and recorded in a memory.

15. The recording and reproducing method according to claim 13 further comprising:
    receiving an instruction to display other thumbnail images, wherein the other thumbnail images are recorded in the disc media behind the thumbnail image data displayed first.

16. A recording and reproducing apparatus to record image data in a disc media and reproduce the image data, comprising:

a recording unit configured to record the image data in said disc media;
a reproducing unit configured to reproduce the image data from said disc media;
an acquiring unit configured to acquire a thumbnail image of the image data;
a storage unit configured to store a thumbnail image file including a plurality of thumbnail images, said thumbnail image file containing a first data area and a second data area;

a control unit configured to control the storage of the thumbnail image in the thumbnail image file, by copying the thumbnail image into the first data area and into the second data area of the thumbnail image file; and
a recording unit configure to record the thumbnail image file in said disc media.

* * * * *